United States Patent
Yasutake

(10) Patent No.: US 9,001,208 B2
(45) Date of Patent: Apr. 7, 2015

(54) IMAGING SENSOR BASED MULTI-DIMENSIONAL REMOTE CONTROLLER WITH MULTIPLE INPUT MODE

(75) Inventor: Taizo Yasutake, Cupertino, CA (US)

(73) Assignee: Primax Electronics Ltd., Taipei (TW)

( * ) Notice: Subject to any disclaimer, the term of this patent is extended or adjusted under 35 U.S.C. 154(b) by 416 days.

(21) Appl. No.: 13/490,234

(22) Filed: Jun. 6, 2012

(65) Prior Publication Data

US 2012/0320198 A1  Dec. 20, 2012

Related U.S. Application Data

(60) Provisional application No. 61/498,030, filed on Jun. 17, 2011.

(51) Int. Cl.

| G06F 3/033 | (2013.01) |
|---|---|
| G06T 7/00 | (2006.01) |
| G06F 3/00 | (2006.01) |
| G06F 3/01 | (2006.01) |
| G06F 3/03 | (2006.01) |
| G06F 3/0346 | (2013.01) |
| H04N 21/422 | (2011.01) |
| H04N 5/44 | (2011.01) |

(52) U.S. Cl.
CPC .............. *G06T 7/0042* (2013.01); *G06F 3/005* (2013.01); *G06F 3/017* (2013.01); *G06F 3/0304* (2013.01); *G06F 3/0346* (2013.01); *H04N 21/42222* (2013.01); *H04N 21/42224* (2013.01); *G06T 2207/30244* (2013.01)

(58) Field of Classification Search
CPC ... G06T 7/0042; G06T 7/30244; G06F 3/005; G06F 3/017; G06F 3/0304; G06F 3/0346; H04N 21/42222; H04N 21/42224
USPC ................................................. 340/348, 345
See application file for complete search history.

(56) References Cited

U.S. PATENT DOCUMENTS

| 2002/0118131 A1* | 8/2002 | Yates et al. ..................... 341/176 |
|---|---|---|
| 2005/0017957 A1* | 1/2005 | Yi .................................. 345/173 |
| 2007/0058047 A1* | 3/2007 | Henty ...................... 348/211.99 |
| 2008/0204605 A1* | 8/2008 | Tsai ............................... 348/734 |
| 2009/0278812 A1* | 11/2009 | Yasutake ....................... 345/173 |
| 2009/0313658 A1* | 12/2009 | Nishimura et al. ............. 725/59 |
| 2010/0238137 A1* | 9/2010 | Han et al. ...................... 345/175 |

OTHER PUBLICATIONS

Liu et al., A Remote Control System Based on Real-Time Image Processing, Sep. 23, 2009, Image and Graphics, 2009. ICIG '09. Fifth International Conference on Image and Graphics, pp. 763-767.*

* cited by examiner

*Primary Examiner* — Richard Torrente
*Assistant Examiner* — Marnie Matt
(74) *Attorney, Agent, or Firm* — Kirton McConkie; Evan R. Witt

(57) ABSTRACT

A method for generating a TV input command using a remote controller having an imaging sensor is presented. The method identifies the corners of a TV display screen from a graphical image captured by an imaging sensor of the remote controller. The method can then perform edge detection and segmentation of the graphical image using reference TV dimensions of the TV display screen to identify the pixel coordinates of the four corners of the TV display screen in the graphical image. The method can then map a camera center position in the pixel coordinates to virtual TV coordinates using a cross ratio algorithm, and then map a location of a cursor in the virtual TV coordinates to the coordinates of the TV display screen.

17 Claims, 33 Drawing Sheets

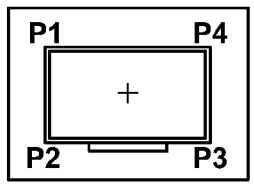 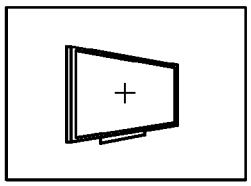 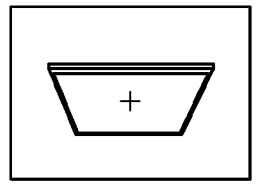 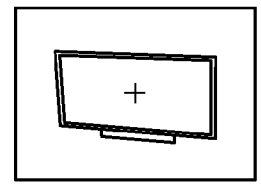
FIG. 20A  FIG. 20B  FIG. 20C  FIG. 20D
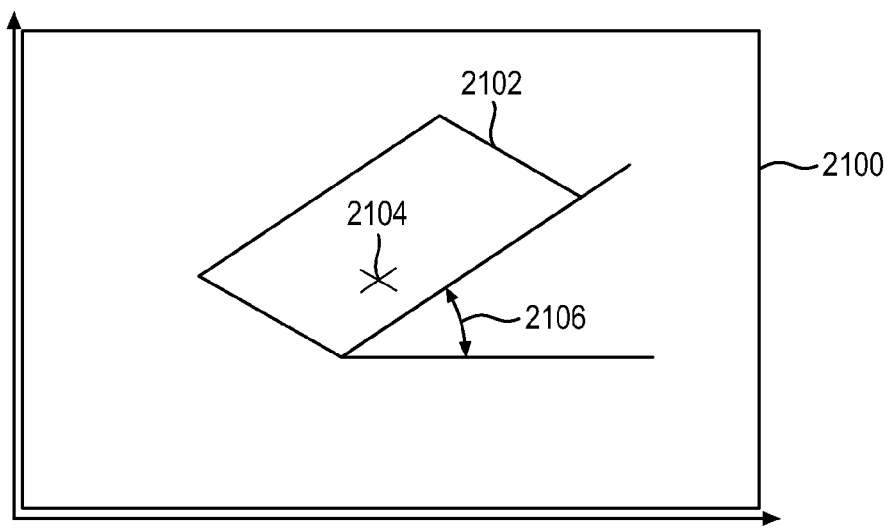
FIG. 21

IMAGING SENSOR BASED MULTI-DIMENSIONAL REMOTE CONTROLLER WITH MULTIPLE INPUT MODE

RELATED APPLICATIONS

This application claims the benefit of U.S. Provisional Application No. 61/498,030 filed Jun. 17, 2011, which and is incorporated herein by reference.

BACKGROUND

The recent development of Internet TV provides not only traditional TV programs but also interactive content such as 2D and 3D webpages, online 2D and 3D games, and so on. In order to meet ever-expanding user requirements of input features for Internet TV, there is a strong demand for the next generation of remote controllers that can provide improved input capabilities over present devices.

SUMMARY

In some aspects, a method is provided for generating an input command for a TV using a remote controller having an imaging sensor. The method identifies the corners of a TV display screen from a graphical image captured by an imaging sensor of the remote controller. The method can then perform edge detection and segmentation of the graphical image using reference TV dimensions of the TV display screen to identify the pixel coordinates of the four corners of the TV display screen in the graphical image. The method can then map a camera center position in the pixel coordinates to virtual TV coordinates using a cross ratio algorithm, and then map a location of a cursor in the virtual TV coordinates to the coordinates of the TV display screen.

In another aspect, a remote controller includes an imaging sensor, a multi-touch touchpad, and a microprocessor. The imaging sensor is configured to perform image capturing and depth sensing. The microprocessor is configured to process imaging sensor data and multi-touch touchpad data received from the image sensor and the multi-touch touchpad based on one of a plurality of input modes. In a gesture input mode or a cursor control mode, the microprocessor is configured to (i) identify the corners of a TV display screen from a graphical image captured by the imaging sensor of the remote controller and (ii) perform edge detection and segmentation of the graphical image using reference TV dimensions of the TV display screen to identify the pixel coordinates of the four corners of the TV display screen in the graphical image.

In yet another aspect, a remote controller input system for a TV is provided. The system includes a remote controller, as described, and a remote controller support module of a TV. The remote controller support module of the TV is configured to (i) map a camera center position in the pixel coordinates to virtual TV coordinates using a cross ratio algorithm and (ii) map a location of a cursor in the virtual TV coordinates to the coordinates of the TV display screen.

These and other features and advantages of the present invention may be incorporated into certain embodiments of the invention and will become more fully apparent from the following description and appended claims, or may be learned by the practice of the invention as set forth hereinafter. The present invention does not require that all the advantageous features and all the advantages described herein be incorporated into every embodiment of the invention.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. These drawings depict only typical embodiments of the invention and are not therefore to be considered to limit the scope of the invention.

FIGS. 20A through 20D are representative images of a TV display captured from multiple angles.

FIG. 21 is a graphical image of a representative TV display inclined at a Z-angle.

DETAILED DESCRIPTION

The embodiments of the present invention can be understood by reference to the drawings, wherein like reference numbers indicate identical or functionally similar elements. It will be readily understood that the components of the present invention, as generally described and illustrated in the figures herein, could be arranged and designed in a wide variety of different configurations. Thus, the following more detailed description, as represented in the figures, is not intended to limit the scope of the invention as claimed, but is merely representative of presently preferred embodiments of the invention.

The following disclosure of the present invention may be grouped into subheadings. The utilization of the subheadings is for convenience of the reader only and is not to be construed as limiting in any sense.

Various operations may be described as multiple discrete operations in turn, in a manner that may be helpful in understanding embodiments of the present invention; however, the order of description should not be construed to imply that these operations are order dependent.

It will be understood that embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a computer device capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

Hardware and Software Structures of the Remote Controller and Internet TV

Figure 1:
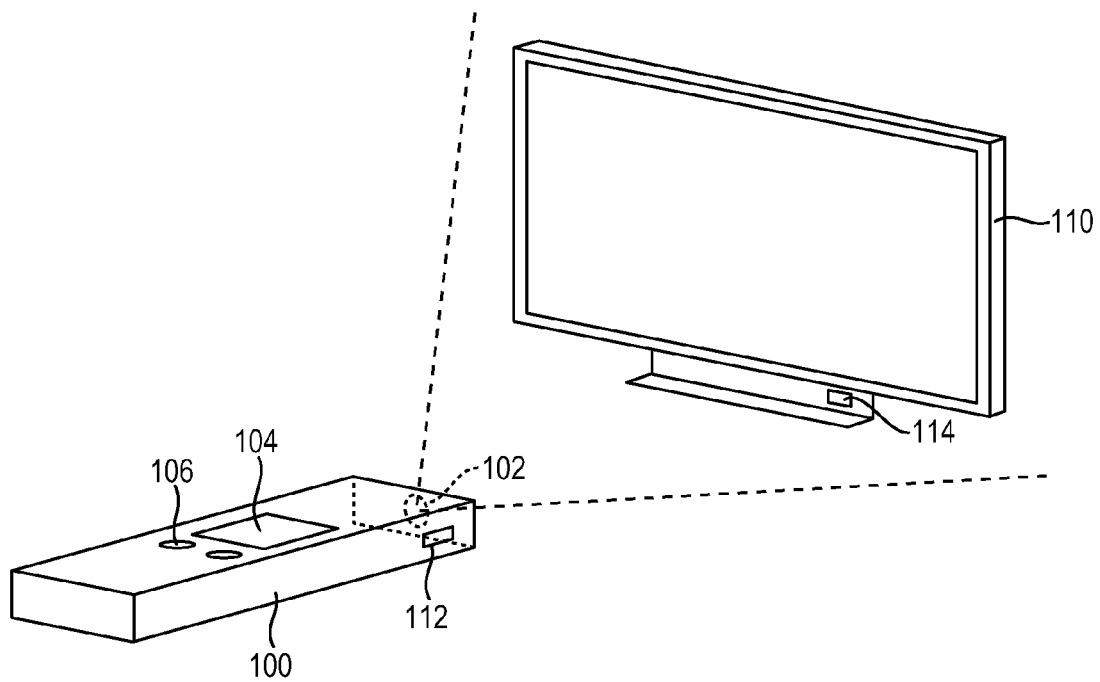
FIG. 1 is a perspective view of a representative remote controller and Internet TV.

FIG. 1 depicts a perspective view of a remote controller 100. Embodiments of the remote controller 100 include a 2D or 3D pixel-based imaging sensor 102 and a touchpad 104 for providing inputs to an Internet TV 110. The touchpad 104 can be a multi-touch touchpad (or "multi-touch touchpad"), and can be used as a digitizer. The touchpad 104 can operate by reporting absolute touch position coordinates or operate in a conventional 2D mouse mode that provides relative position-based commands. Additionally, remote controller 100 can include one or more buttons 106 for providing additional inputs to an Internet TV 110 or for changing the mode of the remote controller 100, as described below. Firmware in the remote controller 100 can be configured to send data packets to the Internet TV 110 through a wireless link, using a wireless communication device 112. Wireless communication can be received by the Internet TV 110 using a wireless communication device 114 in the Internet TV 110. Wireless communication methods employed by the Internet TV 110 and the remote controller 100 can include Bluetooth, RF4CE, WiMAX, WiFi, or other suitable techniques. The Internet TV 100 can include a remote controller support module that is configured to generate multi-dimensional input commands, including cursor position control, from the inputs received from the remote controller 100.

The imaging sensor 102 of the remote controller 100 can perform the dual functions of video image capturing as well as depth sensing. In depth sensing, each pixel in the pixel coordinates can provide a distance between the remote controller 100 and objects in a 3D environment. Using data from a 2D color image, captured by the imaging sensor 102, and depth sensing processes, the remote controller 100 can map a camera center position in the pixel coordinates to the cursor position in the TV screen coordinates.

Figure 2:
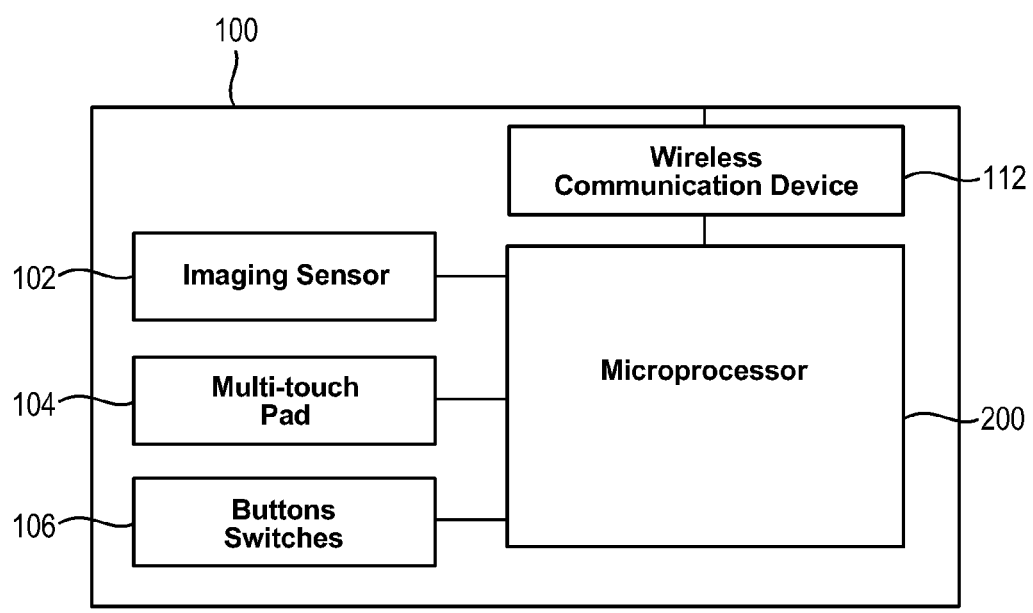
FIG. 2 is a block diagram of representative firmware of a remote controller.

FIG. 2 depicts a functional block diagram of the hardware of the remote controller 100, according to some embodiments. As shown, the hardware of remote controller 100 can include an imaging sensor 102 (e.g., a CMOS 2D/3D imaging sensor), a multi-touch touchpad 104 or digitizer, and buttons 106 or button switches. The imaging sensor 102, the multi-touch touchpad 104, and the buttons 106 can be electronically coupled to a microprocessor 200. Data processed by the microprocessor 200 can be wirelessly transmitted to the Internet TV through a wireless communication device 112.

Figure 3:
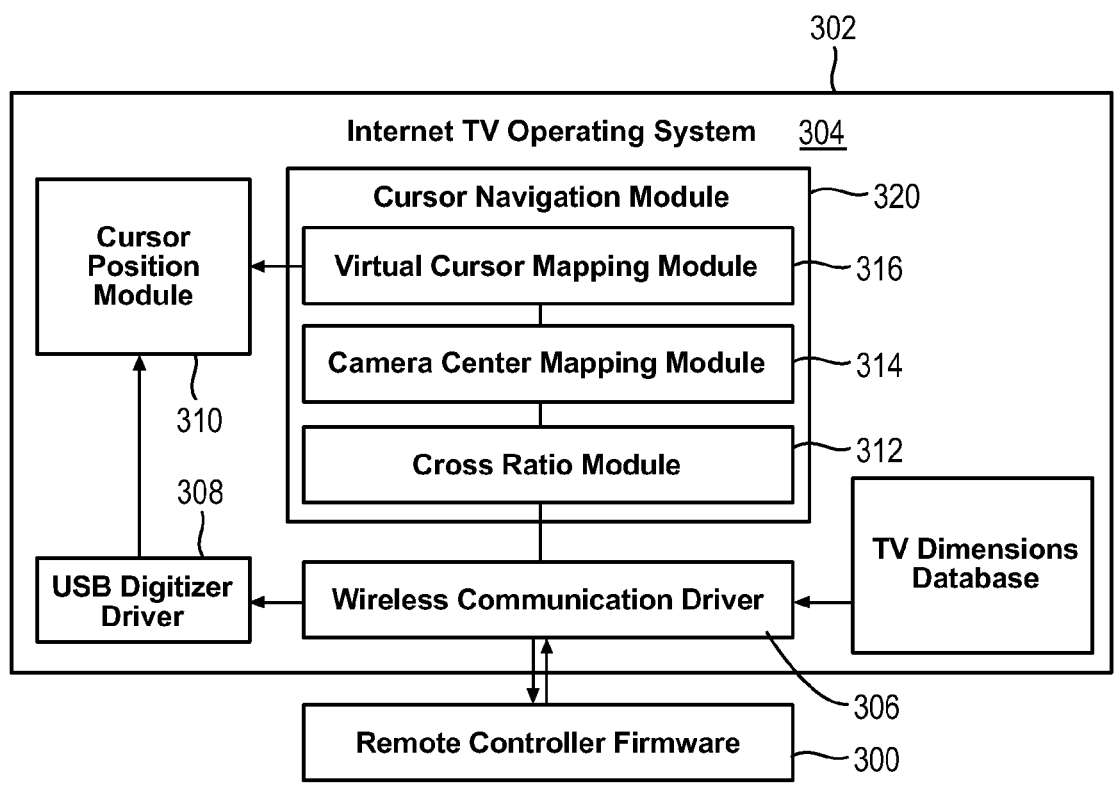
FIG. 3 is a block diagram of representative remote controller firmware and a remote controller support module of an Internet TV.

FIG. 3 depicts a representative functional block diagram of the firmware 300 in the remote controller and a remote controller support module 302 in the Internet TV. The firmware 300 can be configured to send separate data sets from the multi-touch touchpad and the imaging sensor through a wireless link to a wireless communication driver 306 of the Internet TV. In some configurations, the Internet TV can define the remote controller as a composite USB-HID device that includes at least two independent logical devices. The first logical device can be the multi-touch touchpad and the second logical device can be the imaging sensor. The TV operating system 304 can receive the data packets from the remote controller through a wireless communication driver 306. These data packets can be subsequently transmitted to a USB digitizer driver 308 and a cursor navigation module 320.

Multi-Dimensional Input Function

Reference will now be made to the independent input control modes of the remote controller. Subsequently reference will again be made to FIG. 3. As mentioned, the present remote controller can be a multi-functional and multi-dimensional remote controller having three independent input control modes. A first control mode is a cursor position mode that uses a combination of inputs from both the imaging sensor and the touchpad to control a cursor position on the Internet TV. A second control mode is a gesture input mode that generates inputs using the imaging sensor when the remote controller is moved in free space. A third control mode is a multi-touch input mode that uses multi-touch inputs generated by finger touches on the touchpad. Each of these three control modes can be utilized to perform two-dimensional, three-dimensional, and other multi-dimensional input commands. Moreover, as mentioned above the input control modes can be changed by pressing one or more buttons on the remote controller.

In the cursor position mode, data from the imaging sensor generated by moving the remote controller may have a higher priority than data in the touchpad. Imaging sensor data can be used to provide direct pointing command, using absolute position commands, for navigating the cursor navigation on the TV screen. When in the cursor position mode, if the speed of the position change of imaging sensor is lower than predefined threshold value (e.g., when the remote controller's remains substantially still), then inputs from the touchpad can be recognized and utilized for fine cursor control movement. For example, this mode can be used when a user points the remote controller directly at an object on the screen to select the object. When performing this type of input, if the user needs to move the current cursor position slightly or to a more accurate position, the user can hold the remote controller relatively still and move the cursor using the touchpad to perform more fine control movements.

The gesture input mode is used to perform body movement-based gestures in free space. For example, the user may hold the remote controller and move the remote controller to perform a gesture with the remote controller. This gesture is then interpreted as an input command, based on a gesture library. In the gesture input mode, the touchpad is not utilized, and contact with the touchpad may not be recognized and may not result in an input command.

While the gesture input mode only uses input from the imaging sensor, the multi-touch input mode only uses inputs from the touchpad. This mode uses absolute touch position data from finger gesture inputs for finger touch inputs on the touchpad. All imaging sensor data is suppressed under this input mode.

Cursor Position Control Mode

Reference will again be made to FIG. 3 and in particular to parts of the remote controller support module 302 utilized when the remote controller is in the cursor position control mode. When in cursor position control mode, a cursor image can be generated on the TV display. The position of the cursor can be calculated using data from both the imaging sensor and the touchpad. The imaging sensor data can be used to generate coarse (low precision) control of cursor positioning by pointing the imaging sensor at the TV display, which can use absolute position commands. In this process, firmware in the remote controller can execute real-time image processing to detect the four corners of TV frame and send that data to the remote controller support module 302 installed in the Internet TV. While in cursor position control mode, the touchpad data can be used for fine (high precision) control of cursor positioning by relative pointing method (change of position-based command) using finger dragging on the touchpad.

As further shown in FIG. 3, controller support module 302 can include a cursor navigation module 320. This module can compute the absolute cursor position in TV screen coordinates by mapping a camera center position in the pixel coordinates. The cursor navigation module 320 can further utilize a cross ratio module 312, a camera center mapping module 314, and/or a virtual cursor mapping module 316. The cross ratio module 312 can perform a cross ratio calculation of five points using a quadrant ID and predefined virtual markers that correspond to the quadrant ID at the virtual TV frame image in the pixel coordinates. The camera center mapping module 314 can map the camera center in pixel coordinates to the virtual cursor in the virtual TV frame coordinates. This process can use a quadrant ID, cross ratios, and predefined virtual markers in the virtual TV coordinates. The virtual cursor mapping module 316 can map the virtual cursor in a virtual TV frame and map the cursor in the real TV frame. A cursor position module 310 can utilize the output of the cursor navigation module 320 to generate the cursor position command to assist in course-fine control and smooth transition processes. Additionally, in some operating modes, the support TV software 302 can generate a cursor command using data packets from the multi-touch touchpad. The process modules illustrated in FIG. 3 will be described in the subsections below.

Image Processing by the Remote Controller and TV Remote Controller Support Module Referring still to FIG. 3, the imaging sensor can capture an image that is processed by the remote controller firmware 300 and/or the remote controller support module 302 in the Internet TV. Basic steps for image processing can be as follows. First, during an initialization step, imaging parameters are identified. These parameters can include the TV dimension; the distance between the TV display and the imaging sensor, the horizontal, vertical, and roll orientation of the imaging sensor; and a selection of mapping parameter set by the TV remote controller support module 302. Second, an edge detection and segmentation step can be performed. In this step, the imaging sensor detects the four corners of the TV frame. The firmware then segments the image. Third, a continuous mapping step is performed. In this step, the TV remote controller support module 302 maps the coordinates of an absolute cursor position onto the coordinates of a TV display. An execution table that shows these and other steps performed by the imaging sensor and the TV remote controller support module 302 is shown below as Table 1. The details of this table will be more fully described below.

TABLE 1

| Execution Step | Remote Controller | TV Remote controller support module |
|---|---|---|
| Step 1 | (1) Activation of the remote controller. (2) Send an activation signal to the TV. | |
| Step 2 | Execute initialization (1) Capture a graphical image of the one-shot graphical image displayed on the TV with the imaging sensor. (2) Identify depth data and the four corners of the one-shot graphical image object. (3) Send the depth data and four corner of one-shot graphical image object to the TV. (4) Receive the reference TV dimension. (5) Perform edge detection and segmentation on the TV frame object. (6) Send the position of four corner of TV screen in the pixel coordinates to TV. | (1) Display a one-shot graphical image. (2) Identify the reference TV dimension corresponding to the depth data using a look-up table. (3) Send reference TV dimension (4) Compute mapping of camera center position in pixel coordinates to virtual TV screen coordinates using the cross ratio algorithm. (5) Remap the location of the cursor in the virtual TV to "real" TV. (6) Generate a cursor navigation command. |
| Step 3 | Continue the segmentation process of TV frame in the pixel coordinates and sending four corner position data. | Continue the execution of mapping from camera center to cursor position in real TV frame coordinates. |
| Step 4 | Request the one-shot display of specific graphical image on TV screen if necessary (depending on the edge detection result). | (1) Display one-shot graphical image on request from remote controller. (2) Confirm consistency of captured image data with image knowledge database. |
| Step 5 | Return to Step 3. | Return to Step 3 |

Edge Detection, Segmentation of TV Frame, and Identification of the Four Corners of the TV Display Screen The edge detection of the TV display screen and the estimation of the four corner positions of the TV display screen can be performed by a depth sensing camera that simultaneously captures RBG video image as well as depth image (distance data of each pixel between camera and objects). This camera is sometimes called 3D sensing camera and is commercially available. Some examples are Kinect® sensor from Microsoft or Samsung smart TV E8000 with a built-in 3D sensing camera. The hardware structure of the 2D/3D imaging sensor could be a combined component design of conventional 2D color video chip and an independent 3D depth sensing chip like the Kinect® sensor. The single hardware chip that can simultaneously detect both 2D color video image and depth sensing image is also available from Samsung Electronics, Inc.

Figure 4A:
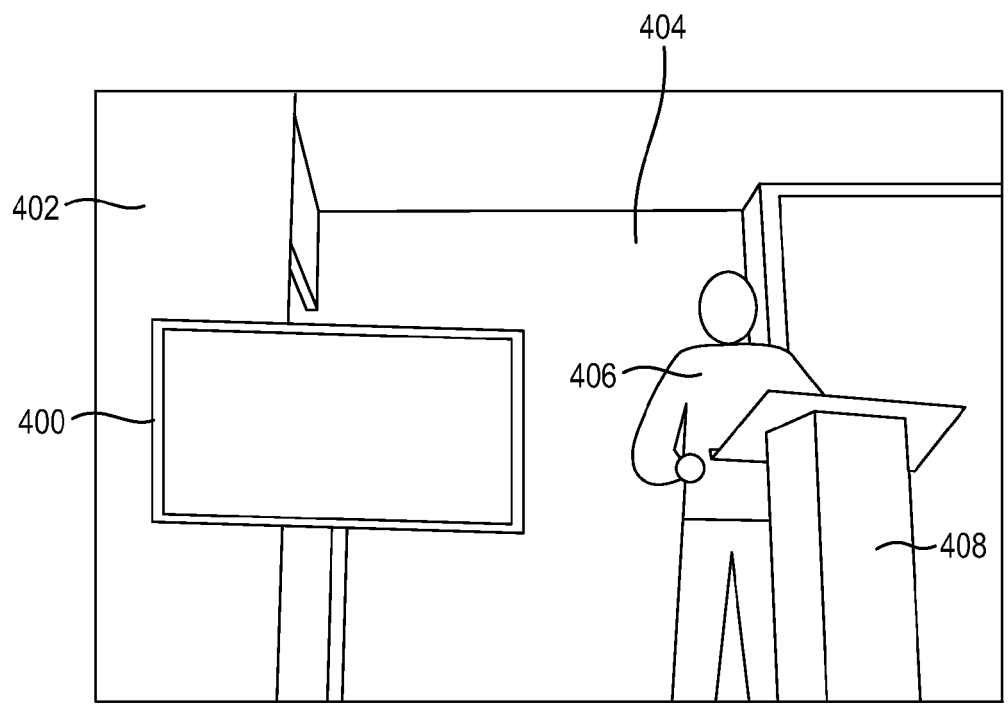
FIGS. 4A through 4F illustrates graphical representations of edge detection, segmentation, and corner identification processes.

In some configurations, the remote controller utilizes both 2D video image and depth sensing data to detect four corners of TV frame image in the pixel plane, as illustrated in FIGS. 4A through 4F. FIG. 4A depicts a representative TV environment for a graphical image of a TV display screen captured using an imaging sensor. The TV environment includes a TV 400, a wall 402 behind the TV 400, a recessed wall 402 even farther behind the TV 400, a person 406, and a podium 408 to the right of the TV 400.

Figure 4B:
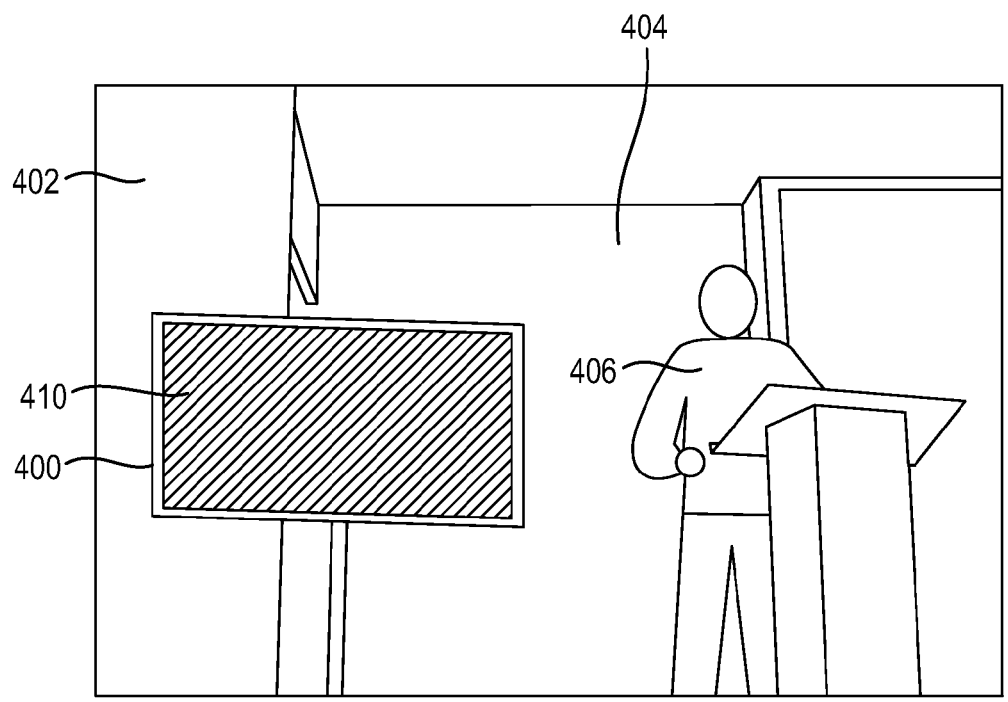
Figure 4C:
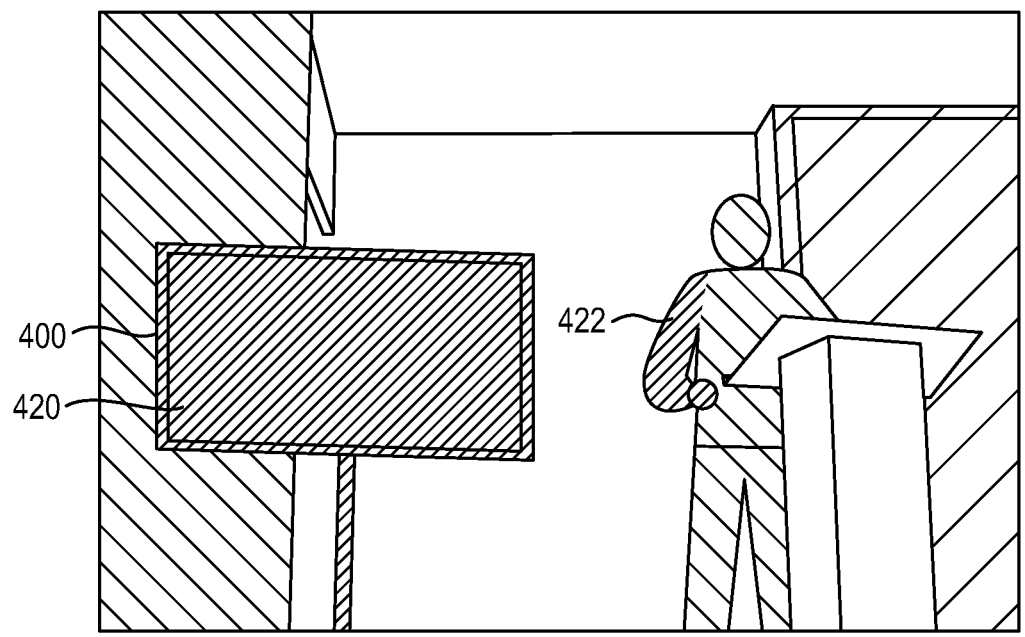
Figure 4D:
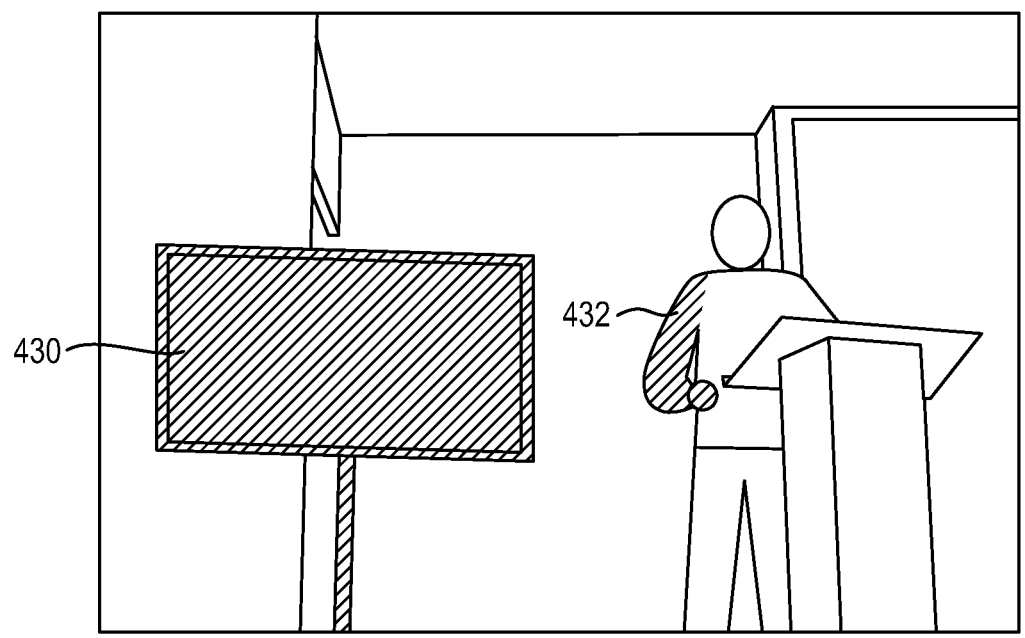
Figure 4E:
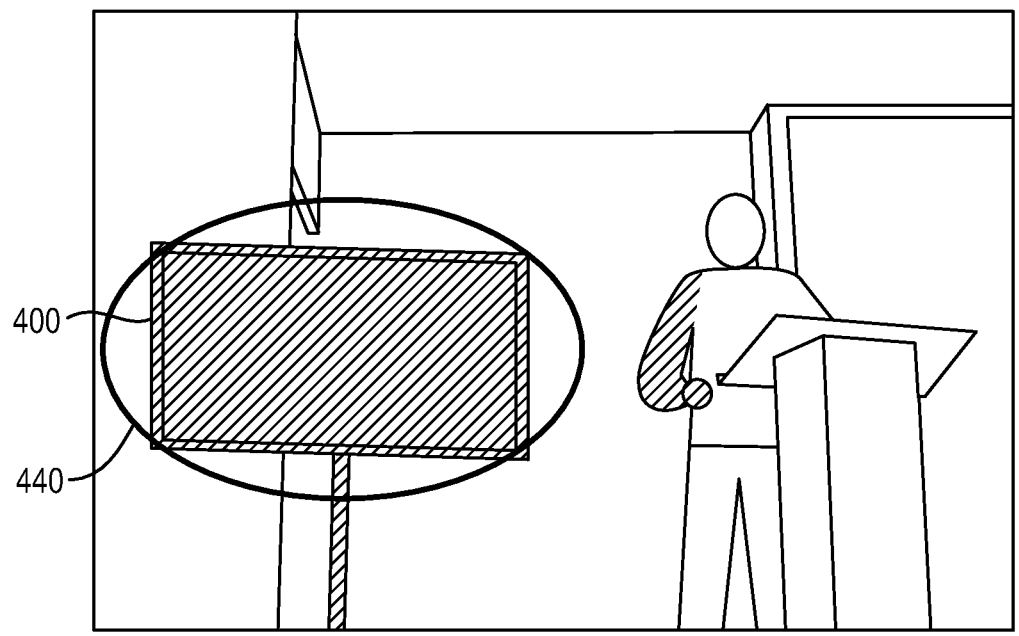
Figure 4F:
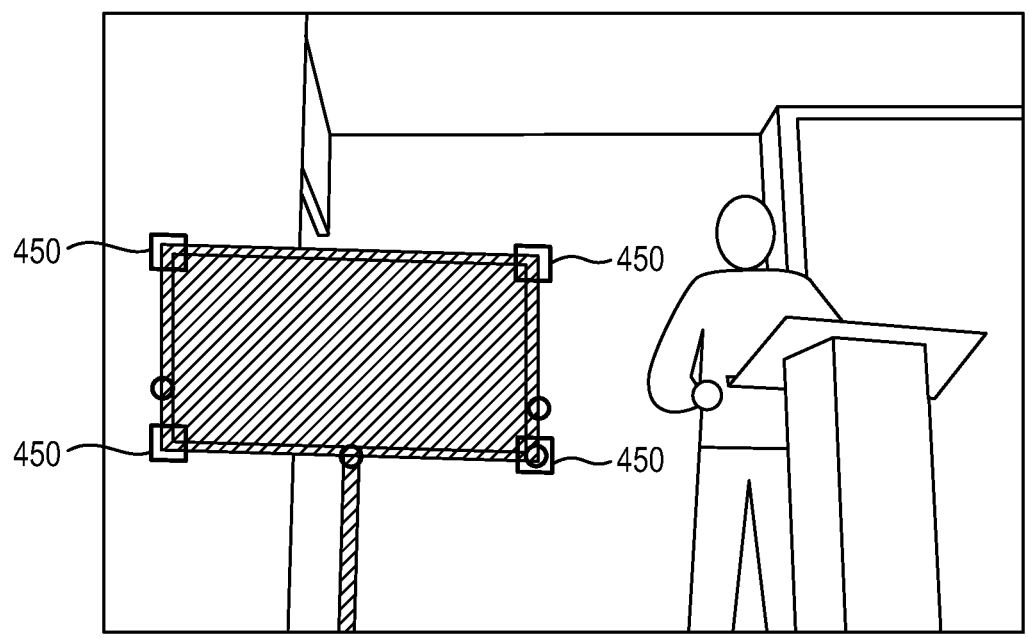

At initialization of cursor navigation by the remote controller, the remote controller can send a command to the TV 400 to display a one-shot screen image, such as a solid color screen 410, such as a blue screen, which is represented in FIG. 4B as a diagonal line fill pattern. The remote controller can then acquire both a video image and depth data from the captured graphical image. The depth data of the graphical image is depicted in FIG. 4C, which depicts objects at different depths in different patterns. Using this image data, the remote controller can then identify the distance between TV display screen 420 and the imaging sensor by finding the distance to the display screen 420. Once the distance to the TV display screen 420 is identified, the remote controller can generate a color histogram based depth image corresponding to the distance. For example, FIG. 4C depicts the depths of objects in the image objects, with objects shown with different fill patterns based on their depths. As shown, objects 420 and 422 are at approximately the same distance from the imaging sensor. Next, a binalization image process can be performed on the image in FIG. 4C with a threshold value corresponding to the distance value of TV display screen 420. Thus, all objects which are located at that distance value can be shown binalized to a solid color. FIG. 4D depicts a binalized image of the image of FIG. 4C. Note that the objects 430, 432 shown filled with fill lines are located at the same distance from the imaging sensor the TV frame. Once the distance data of TV frame is identified, the remote controller can then obtain pre-measured TV frame dimensions stored in a look-up table database, described later. Using the pre-measured TV dimension data in the database, the remote controller can correctly identify the object in the image 440 (shown within an ellipse for clarification only) that has the most similar dimension to the TV display screen, as shown in FIG. 4E. After TV object recognition (segmentation of TV frame) is successfully done, the position of each corner 450 of TV frame can be determined in pixel coordinates, as shown in FIG. 4F. The position of the centroid of the TV frame can then be easily calculated using the position of four corners 450.

Figure 5:
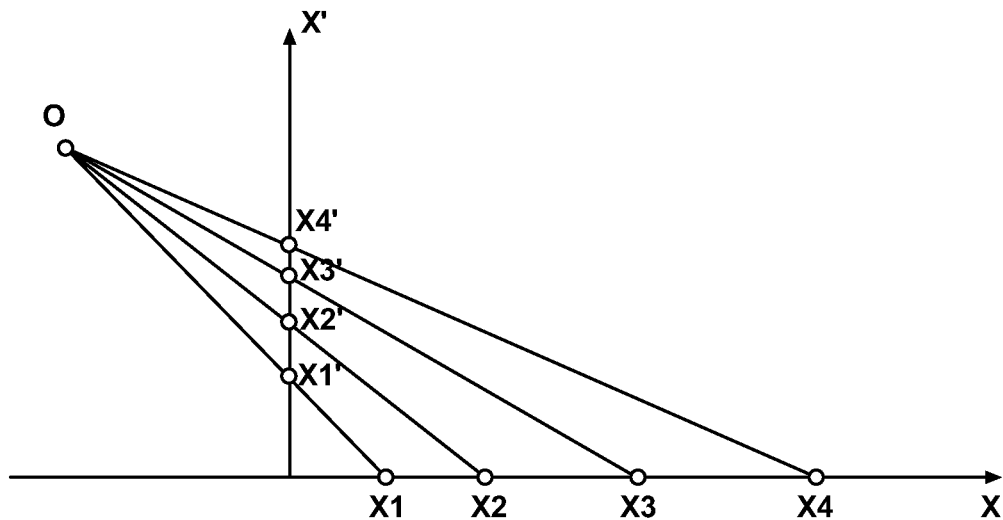
FIG. 5 is a two-dimensional graphical representation of four lines crossing through two planes.

The Cross Ratio Algorithm to Map the Camera Center Point to the TV Frame Coordinates After the position of corners of the TV display screen are identified in pixel coordinates, a cross ratio algorithm can be used to map the camera center point and the TV frame coordinates. A cross ratio, or double ratio, is defined as a ratio of a ratio in the geometry field of applied mathematics. For example shown in FIG. 5, four lines extend from point O. Along these lines points x1, x2, x3, x4 and x1', x2', x3', x4' are related by a projective transformation so their cross ratios, (x1, x2; x3, x4) and (x1', x2'; x3', x4') are equal, as shown in Equation 1 below.

Cross Ratio = $[(x1 - x3)/(x2 - x3)]/[(x1 - x4)/(x2 - x4)]$ = $[(x1' - x3')/(x2' - x3')]/[(x1' - x4')/(x2' - x4')]$     Equation 1

Figure 6:
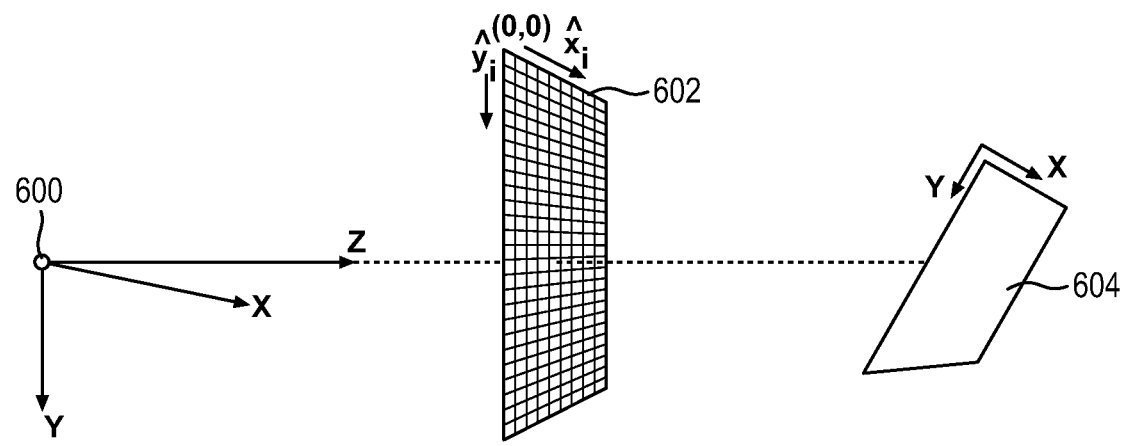
FIG. 6 is a three-dimensional graphical representation of a line passing through two planes.

The remote controller previously described can utilize the invariant property of cross ratios to map a camera center in the pixel coordinates to locate a cursor position on the TV screen coordinates, as shown in FIG. 6. FIG. 6 shows an optical center 600 projecting a line through the projective transform by the camera lens 602. The line continues to the TV screen 604.

It is well known in computer graphics that the correspondence between pixel coordinates (x, y, z) and TV screen coordinates (X, Y) can be defined by a projective transform, which is shown below as Equation 2.

$$\underbrace{\begin{bmatrix} x_i \\ y_i \\ z_i \end{bmatrix}}_{\text{Pixel image coords.}} = \underbrace{\begin{bmatrix} f_x & \alpha & o_x & 0 \\ 0 & f_y & o_y & 0 \\ 0 & 0 & 1 & 0 \end{bmatrix}}_{\text{Intrinsic matrix}} \underbrace{\begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix}}_{\text{Extrinsic matrix}} \underbrace{\begin{bmatrix} X \\ Y \\ 0 \\ 1 \end{bmatrix}}_{\text{TV coords.}}$$
Projective Transform Matrix     Equation 2

The projective transform matrix consists of an intrinsic matrix and extrinsic matrix. The intrinsic matrix expresses internal camera parameters, such as focal length. The extrinsic matrix expresses the relationship of 3D translation and rotation between 2D pixel scene and 3D image environment including the TV frame. Every 2D position defined in the TV screen coordinates can be captured by a digital camera through a camera lens. The lens physically performs as projective transform matrix to map any points between pixel coordinates and TV coordinates.

The projective transform, or sometimes called 2D homography transform, preserves a cross ratio, the ratio of the ratio of lengths, collinearity of points and the order of points across viewing. Since those projective invariants remain unchanged under the image transformation, the cross ratio could be used to map the camera center position in the pixel coordinates to the cursor position in the TV screen coordinates. In other words, the value of cross ratio computed from five known points (pre-defined four positions or "virtual markers" and camera center position) in pixel coordinates should be the same value of the cross ratio computed from four known points and unknown cursor position in the TV screen coordinates. The cursor position corresponding to the camera center could be determined by solving unknown position ($X_{cursor}$, $Y_{cursor}$) with the cross ratio provided by the pixel plane shown in FIGS. 7, 8A, and 8B.

Figure 7:
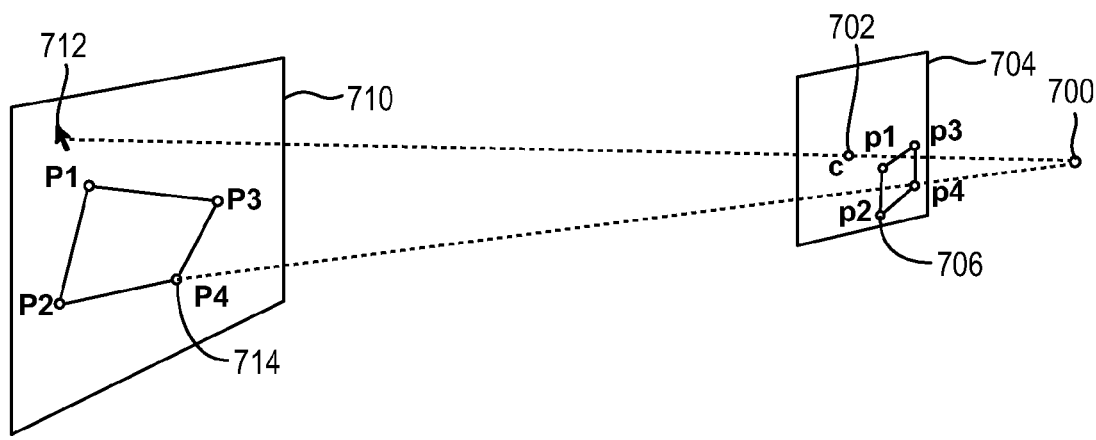
FIG. 7 is a graphical representation of a projective transform and the mapping of a camera center to a cursor.

FIG. 7 shows a projective transform and the mapping of a camera center to a cursor. This figure illustrates a center of projection 700 by an imaging sensor. The projection passes through an imaging plane 704, which includes camera pixel coordinates p1, p2, p3, and p4 and a camera center, C. The projection continues to a reference plane 710, which includes a cursor 712 and TV screen coordinates 714, labeled as P1, P2, P3, and P4.

Figure 8A:
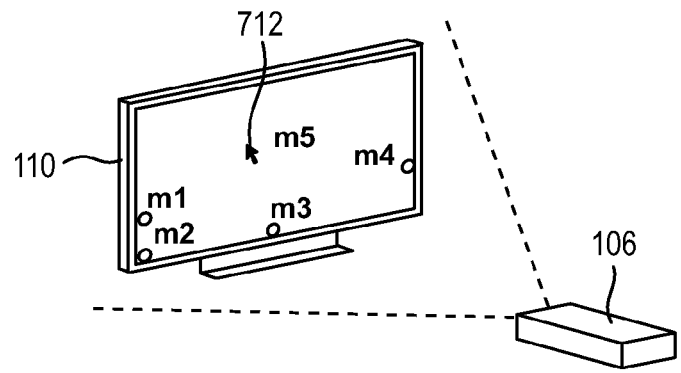
FIGS. 8A and 8B illustrate a cross ratio as an invariant between TV screen coordinates and camera pixel coordinates.
Figure 8B:
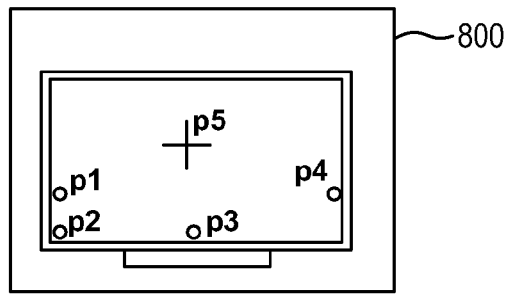

FIGS. 8A and 8B show a cross ratio as an invariant value between the TV screen coordinates and the camera pixel coordinates. FIG. 8A illustrates imaging sensor 106, a TV 110 with a cursor 712 and markers m1, m2, m3, and m4. FIG. 8B illustrates a captured image of a TV 800 with a camera center, labeled p5, placed at the center of the TV image. Markers p1, p2, p3, p4 are shown corresponding to markers m1 through m4. It is noted that the Cross Ratio$_{TV}$=F(m1, m2, m3, m4, p5) is the same value as Cross Ratio$_C$=F(p1, p2, p3, p4, p5).

It is known in applied mathematics that there are two cross ratio equations with five points but no three collinear points in the projective transform shown below. Using two cross ratios, the unknown cursor position ($X_{cursor}$, $Y_{cursor}$) can be computed using Equations 3 and 4 shown below.

Cross Ratio 1=$(|M_{431}|*|M_{521}|)/(|M_{421}|*|M_{531}|)$

Cross Ratio 2=$(|M_{421}|*|M_{532}|)/(|M_{432}|*|M_{521}|)$     Equations 3 and 4

In Equations 3 and 4, the $M_{ijk}$ is a matrix $$M_{ijk} = \begin{pmatrix} xi & xj & xk \\ yi & yj & yk \\ 1 & 1 & 1 \end{pmatrix}$$

with suffices i, j, and k being point ID number. ($x_i$, $y_i$) is a 2D coordinate of the point number i. The scalar value $|M_{ijk}|$ is a determinant of matrix $M_{ijk}$.

Figure 9:
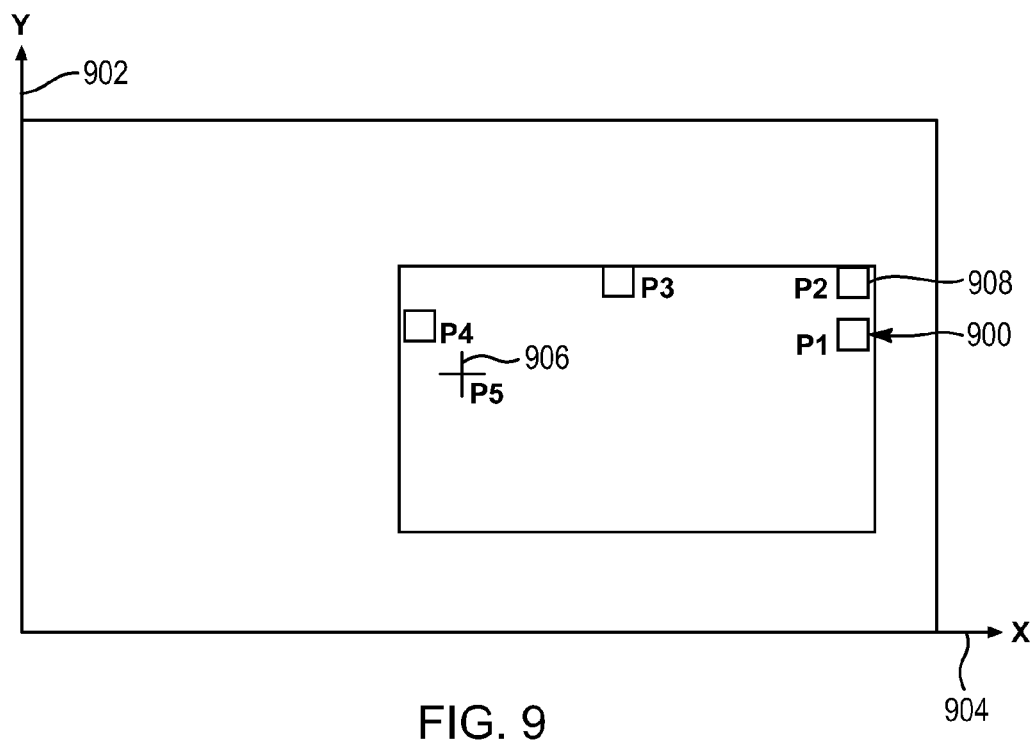
FIG. 9 is a graphical representation of pixel coordinates having representative virtual markers mapped on to TV coordinates.

The computational procedures of calculating cursor navigation using the cross ratio can thus include the following four steps:

STEP 1: In a first step, raw data packets of pre-defined four points are received for the cross ratio calculation or "virtual marker" positions in the pixel coordinates. This step is illustrated in FIG. 9, which illustrates a TV screen 900 that is a captured image located on an X-axis 904 and a Y-axis 902 in the pixel coordinates. This includes the computation of four virtual marker positions Pi (i=1-4) 908 in captured TV frame image. This also includes a fifth point P5 906, which is a camera center position. For example, in VGA resolution displays, P5 can be located at (320, 240) in the (X, Y) coordinate system.

STEP 2: In a second step, cross ratios are computed using the point data from the first step. For instance, using a pre-defined point data of Pi (with i=1, 2, 3, 4) and P5, the camera center position, the cross ratios, CR1 and CR2 could be analytically obtained, if a three point collinear condition is avoided, using Equations 3 and 4. These operations may be performed as follows:

$Pi(x,y)$=position of virtual marker $i$ $P5(x,y)$=camera center position in the pixel plane coordinates.

$|M431|=P4xP3y+P3xP1y+P1xP4y-(P1xP3y+P3xP4y+P1yP4x)$ $|M421|=P4xP2y+P2xP1y+P1xP4y-(P1xP2y+P2xP4y+P1yP4x)$ $|M432|=P4xP3y+P3xP2y+P2xP4y-(P2xP3y+P3xP4y+P2yP4x)$ $|M521|=P5xP2y+P2xP1y+P1xP5y-(P1xP2y+P2xP5y+P1yP5x)$ $|M531|=P5xP3y+P3xP1y+P1xP5y-(P1xP3y+P3xP5y+P1yP5x)$ $|M532|=P5xP3y+P3xP2y+P2xP5y-(P2xP3y+P3xP5y+P2yP5x)$

STEP 3: After these calculations are preformed, in a third step, the cursor position is computed using the cross ratios obtained in step two. For example, the cursor position Cur (x5, y5) in the TV screen coordinates can determined as follows:

$$x5 = -(E*(A*F-C*D)/(B*D-A*E)+F)/D$$

$$y5 = (A*F-C*D)/(B*D-A*E)$$

The scalar values A, B, C, D, E, and F are shown below.

$$A = (CR1*|M\_TV421|*(Y3-Y1)-|M\_TV431|*(Y2-Y1))$$

$$B = (CR1*|M\_TV421|*(X1-X3)-|M\_TV431|*(X1-X2))$$

$$C = (CR1*|M\_TV421|*(X3Y1-X1Y3)-|M\_TV431|*(X2Y1-X1Y2))$$

$$D = (CR2*|M\_TV432|*(Y2-Y1)-|M\_TV421|*(Y3-Y2))$$

$$E = (CR2*|M\_TV432|*(X1-X2)-|M\_TV421|*(X2-X3))$$

$$F = (CR2*|M\_TV432|*(X2Y1-X1Y2)-|M\_TV421|*(X3Y2-X2Y3))$$

In these equations, CR1, CR1 are the cross ratios computed in step two. The virtual marker position of Vi=(Xi, Yi) is pre-determined in the TV screen coordinates. The determinants $|M\_TV_{ijk}|$ are calculated by the virtual marker position Vi=(Xi, Yi), in TV coordinates.

STEP 4: After step three is completed, the process is repeated, returning to step one.

Avoidance of Calculation Overflow at the Cross Ratio-Based Mapping

Figure 10:
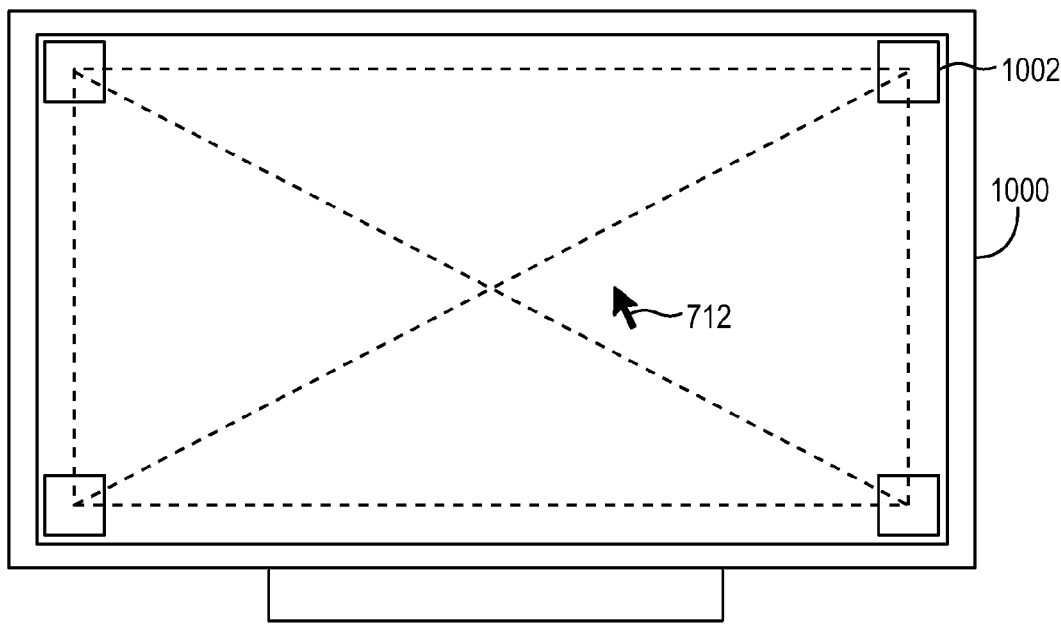
FIG. 10 is a graphical representation of representative virtual marker locations that result in a three point collinear condition and calculation overflow.

A calculation difficulty of the cross ratio is also known in projective geometry. When three points are located on a same line (collinear), the cross ratio will be zero or infinity. FIG. 10 shows an example of calculation overflow with three point collinear condition. In this case, four corners 1002 of TV frame 1000 are selected as pre-defined points for cross ratio calculation as virtual markers. When the cursor 712 is placed on the one of connecting lines between each point, the three point collinear condition occurs.

Figure 11A:
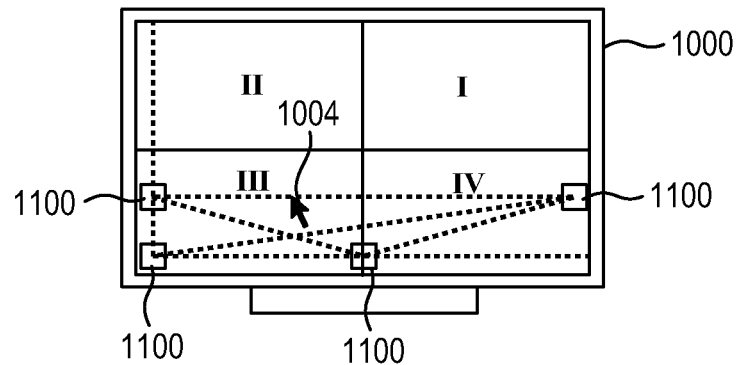
FIGS. 11A and 11B are graphical representations of virtual markers on a display screen and in a captured graphical image that results in a three point collinear condition.
Figure 11B:
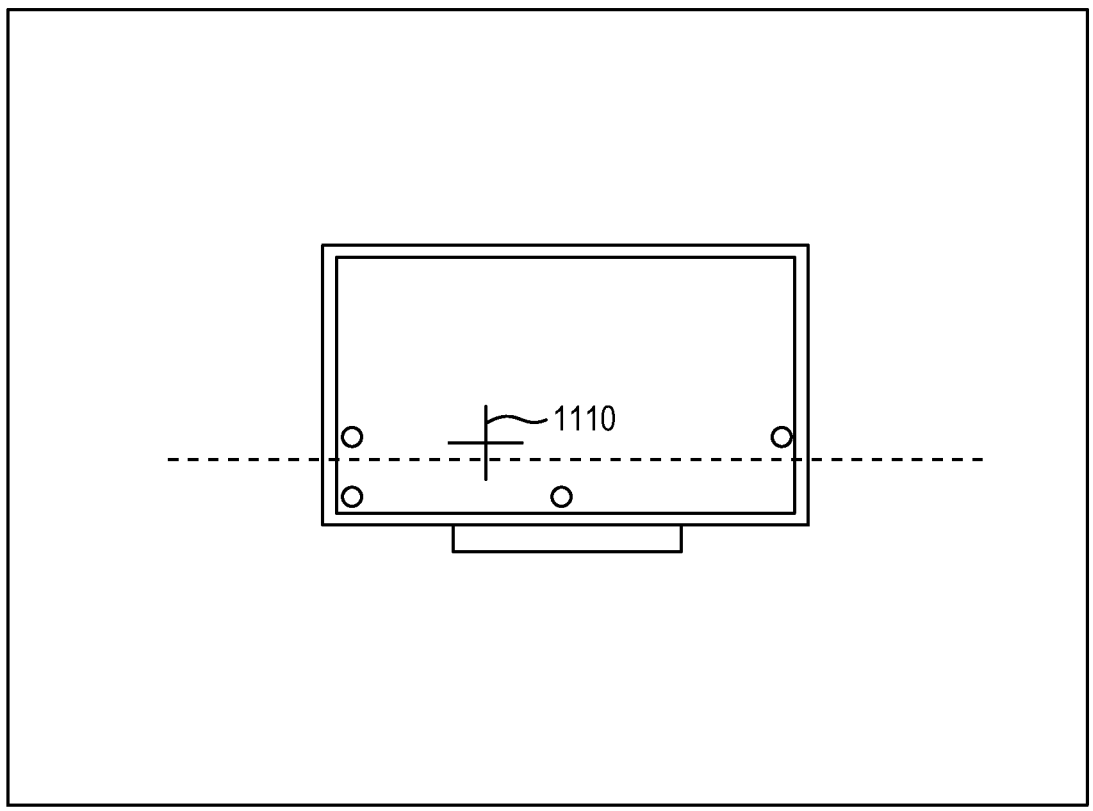

FIGS. 11A and 11B also shows another example of three point collinear conditions with different virtual marker 1100 set. FIG. 11A illustrates TV screen coordinates divided into quadrants. FIG. 11B illustrates the pixel coordinates and a camera center 1110 corresponding to FIG. 11A.

In order to avoid collinear condition at the cross ratio based mapping, the cursor navigation module can identify the quadrant that contains the cursor. FIGS. 12A through 12D depict appropriate locations of virtual markers 1100 to effectively compute the cross ratio depending on the current location of cursor in the TV screen coordinates. The pre-defined four points for the cross ratio calculation for these examples is shown below.

FIGS. 12A through 12D show a first virtual marker 1100 which is located at the diagonal quadrant of the quadrant containing the cursor is selected as a point for the cross ratio. Then, the second virtual marker 1100 is located on the horizontal side line including the first virtual marker 1100 and its distance from the first virtual marker 1100 is a half of horizontal side line. The third virtual marker 1100 is located on the vertical side line including the first virtual marker 1100 and its distance from the first virtual marker 1100 is one fourth of vertical side line. The forth virtual marker 1100 is located the opposite vertical side line and its height is one fourth of vertical side line.

Figure 12A:
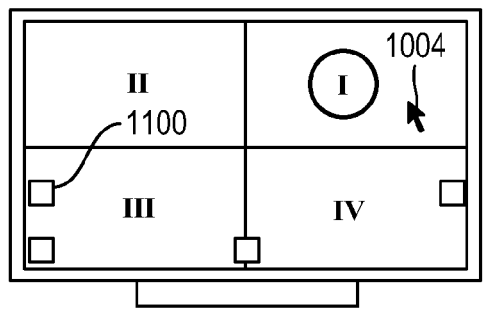
FIGS. 12A through 12D are representative virtual marker locations based on the quadrant in which a cursor is located.
Figure 12B:
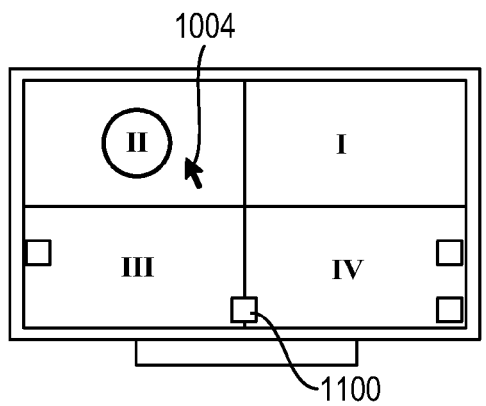
Figure 12C:
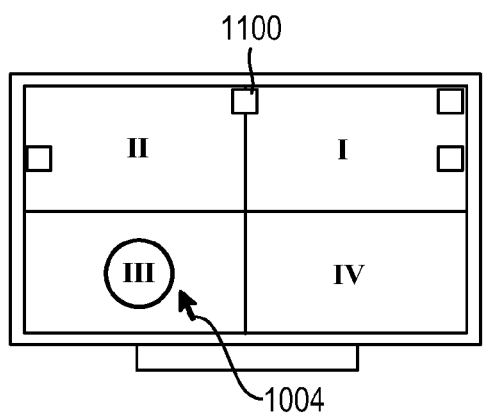
Figure 12D:
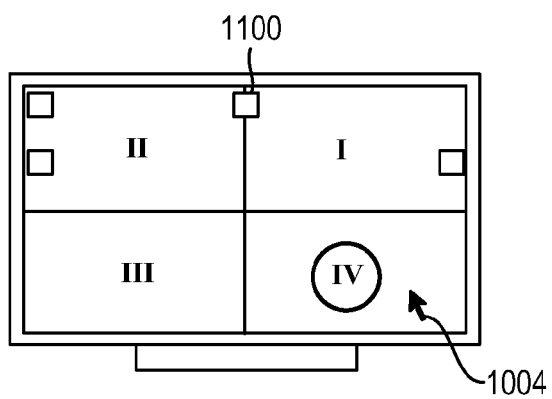

In other words, if the cursor location is in quadrant I and its movement is within quadrant I or quadrant II in the TV screen, then the locations of virtual markers 1100 shown in FIG. 12A or 12B do not create their collinear condition. Similarly, if the cursor location is in quadrant II and its movement is within quadrant I or quadrant II in the TV display screen, then the location of virtual markers 1100 shown in FIG. 12B does not create their collinear condition. If the cursor location is in quadrant III and its movement is within quadrant III or quadrant IV in the TV screen, then the location of virtual markers 1100 shown in FIG. 12C does not create their collinear condition. In addition, if the cursor location is in quadrant IV and its movement is within quadrant III or quadrant IV in the TV screen, then the location of virtual markers 1100 shown in FIG. 12D does not create their collinear condition.

Figure 13A:
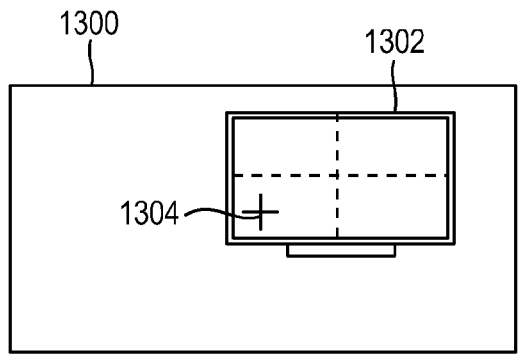
FIGS. 13A through 13D illustrate a cursor generation process involving a successfully performed cross ratio calculation.
Figure 13B:
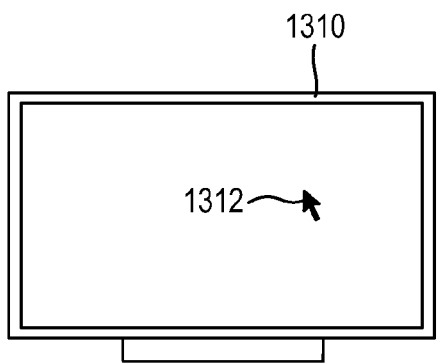
Figure 13C:
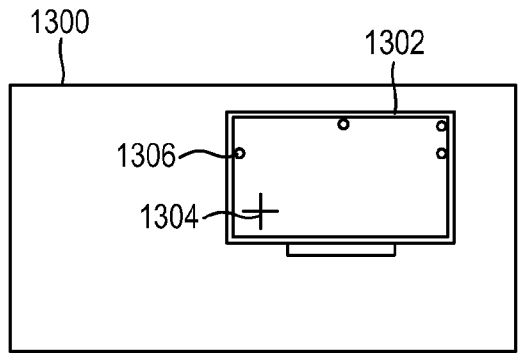
Figure 13D:
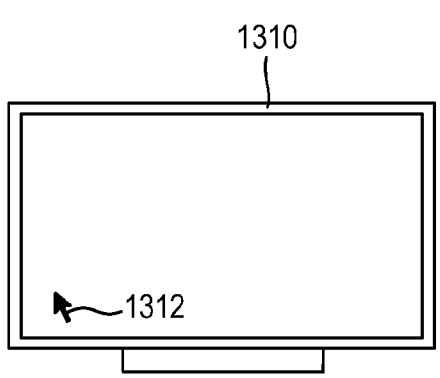

FIGS. 13A through 13D illustrate an example of successfully performing the cross ratio calculation at an initial condition (beginning of remote controller navigation) and continuous cursor navigation. In FIG. 13A, at beginning of cursor navigation, the imaging sensor of remote controller identifies, within the captured image, the quadrant of captured TV frame 1302 that contains the camera center 1304. The remote controller sends a message data of identified quadrant to TV support program. As shown in FIG. 13B, the TV support program can receive this data, but does not update the position of the cursor 1312 on the TV display 1310. As shown in FIG. 13C, after the quadrant and the pre-defined four virtual marker 1306 positions for cross ratio calculation in the pixel coordinates, the remote controller shall send to TV remote controller support module the data set that includes the current quadrant ID, the four corner positions, and the five points for the cross ratio calculation in the pixel plane. The TV remote controller support module can then compute the cross ratio in the pixel plane on behalf of the remote controller, and then compute the pre-defined four virtual markers in the TV screen coordinates corresponding to the quadrant ID sent by the remote controller. Next, as shown in FIG. 13D, the TV support program can compute the updated cursor 1312 position using the computed cross ratio and the virtual markers pre-determined in the TV screen coordinates.

The Concept of a Virtual TV Frame

A purpose of cross-ratio-based mapping can be to map the camera center position in the pixel coordinates to the cursor position in the real TV screen coordinates. However, it is not necessarily suitable to use simple mapping from the camera center in the pixel coordinates to the real TV screen coordinates when the camera is located a long distance from TV frame. In these circumstances, the captured image of TV frame in the pixel coordinates may be too small to reliably compute its cross ratio using pre-defined four points (virtual markers) in the pixel coordinates.

Figure 14:
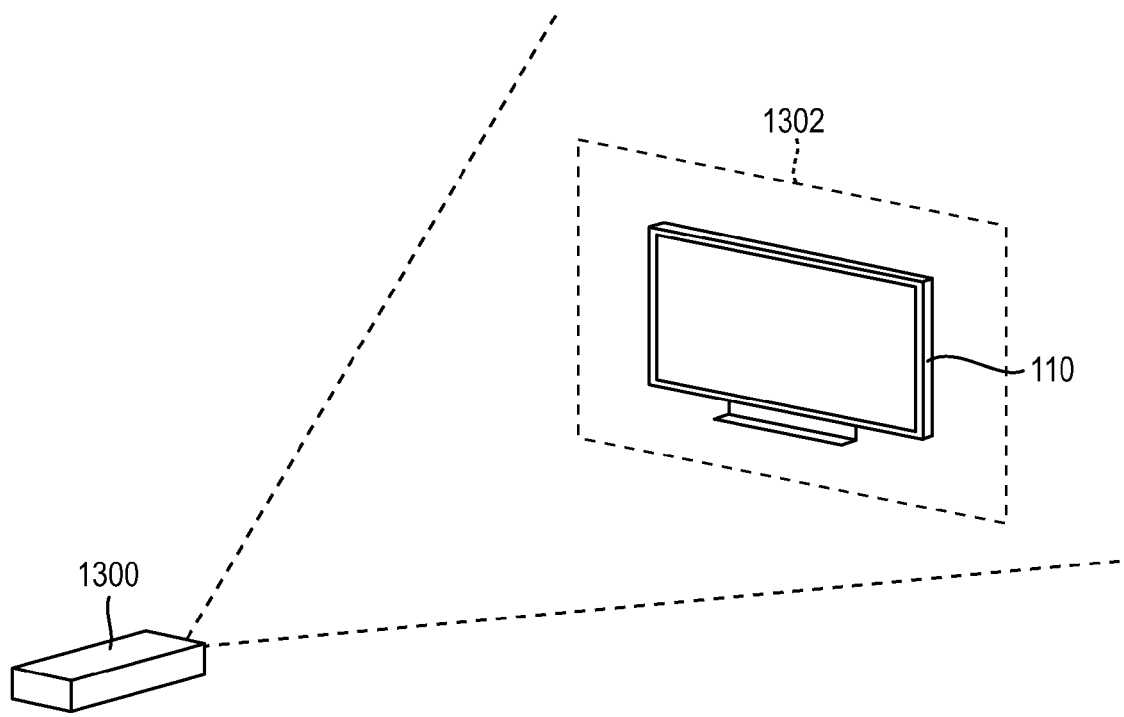
FIG. 14 is a perspective view of a remote controller, and Internet TV, and a representative virtual TV frame.

Accordingly, the concept of a virtual TV frame can be utilized to overcome the difficulties posed when using the remote controller from a long-distance. FIG. 14 depicts how the virtual TV frame can operate for the precision problem due to the long distance between the TV frame and the remote controller. The basic idea is to define a virtual TV frame 1302 that is large enough to maintain the precision of the cross ratio calculation and resulting cursor navigation. Thus, FIG. 14 shows a virtual TV frame 1302 as an expanded TV frame that is larger than the actual TV frame 110. The cursor navigation module can utilize the virtual TV frame 1302 for the cross ratio calculation and mapping of the camera center to the virtual TV frame coordinates. The size of virtual TV frame 1302 can be user programmable and any size could be used, but its size should be larger than dimensions of the real TV frame 110.

Figure 15:
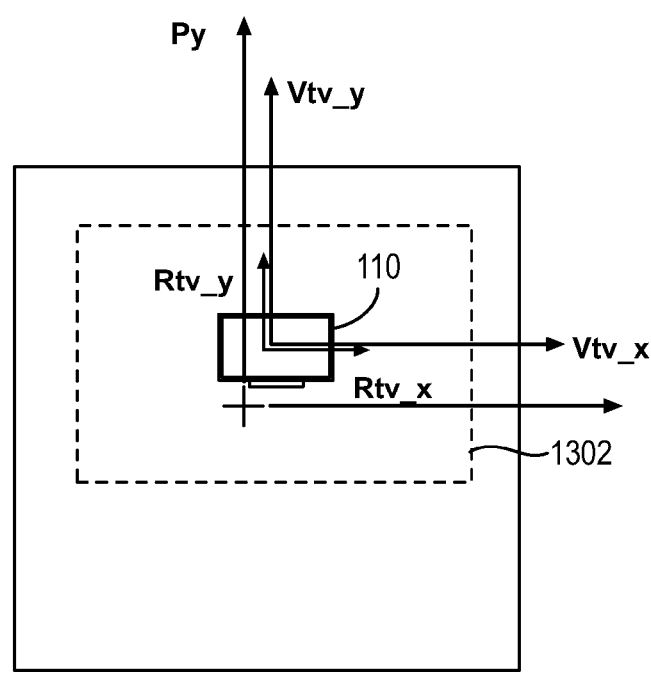
FIG. 15 is a captured image of a TV frame and a representative virtual TV frame.

FIG. 15 depicts the captured image of real TV frame 110 and the user defined virtual TV frame 1302, having a width and height approximately three times larger than the real TV frame 110, in the pixel coordinates.

Figure 16A:
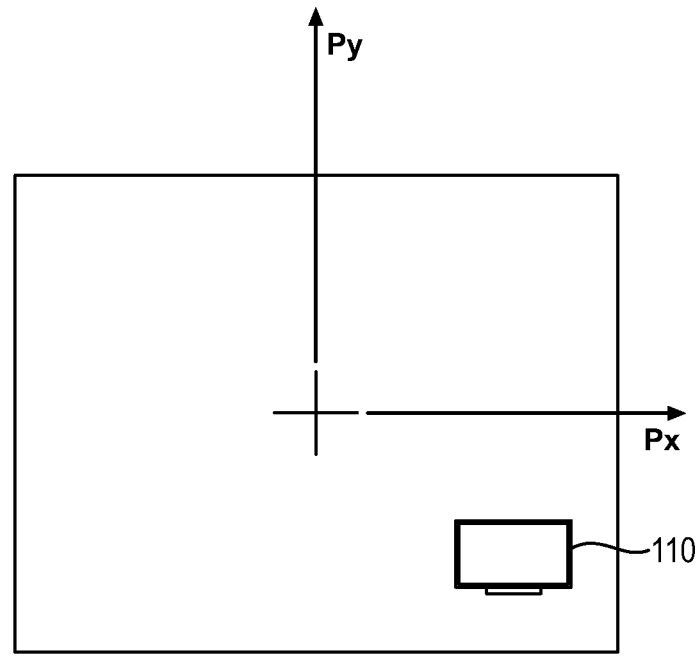
FIG. 16A is a captured image and graphical representation of the captured image using a representative virtual TV frame centered about the TV.
Figure 16A:
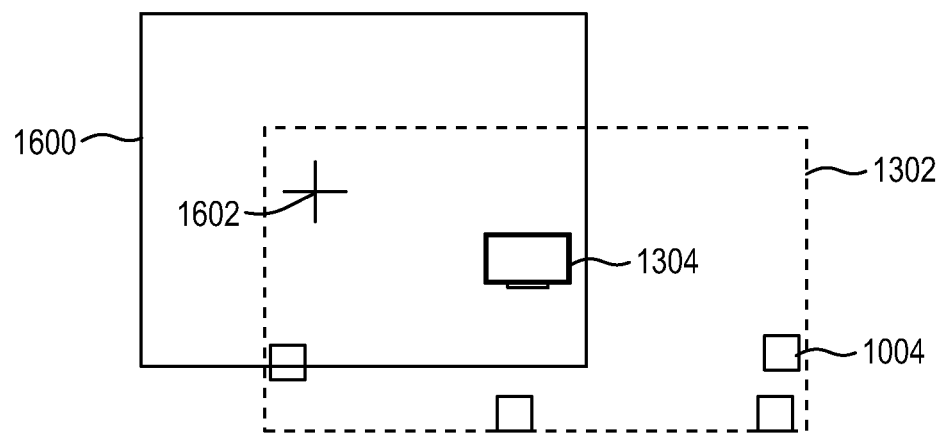

FIG. 16A illustrates the calculation of cross ratio using the virtual TV frame as if it is captured in the pixel coordinates. In FIG. 16A, the imaging device captured the image of real TV frame 110 within its pixel plane 1600. The centroid position of the real TV frame 110 can be calculated in the pixel coordinates. Then, the virtual TV frame 1302 can be defined around the centroid of real TV frame image, as shown. Then, the cursor navigation module can identify the quadrant of virtual TV frame 1302 that contains the camera center 1602. The positions of pre-defined four points (virtual markers) 1004 for cross ratio calculation in the virtual TV frame can then be determined based on the method described with reference to FIGS. 12A through 12D.

Figure 16B:
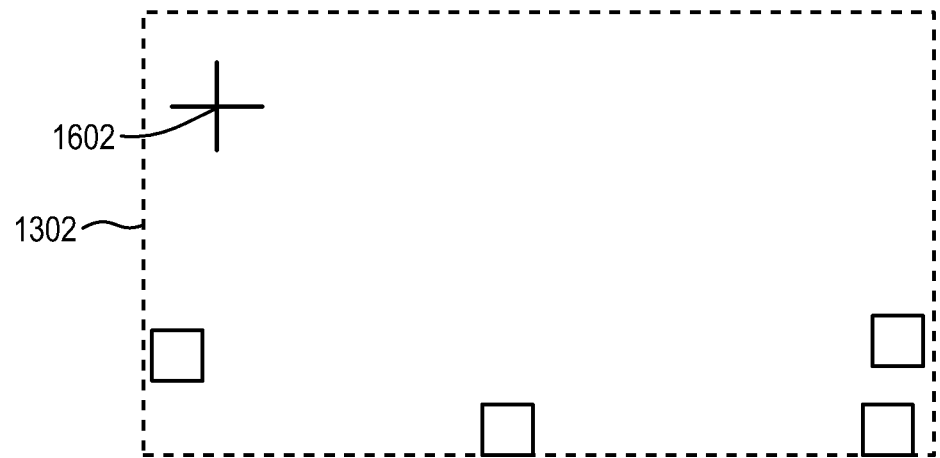
FIGS. 16B through 16D illustrate graphical representations of steps in the calculation of a cursor position.
Figure 16C:
Figure 16D:
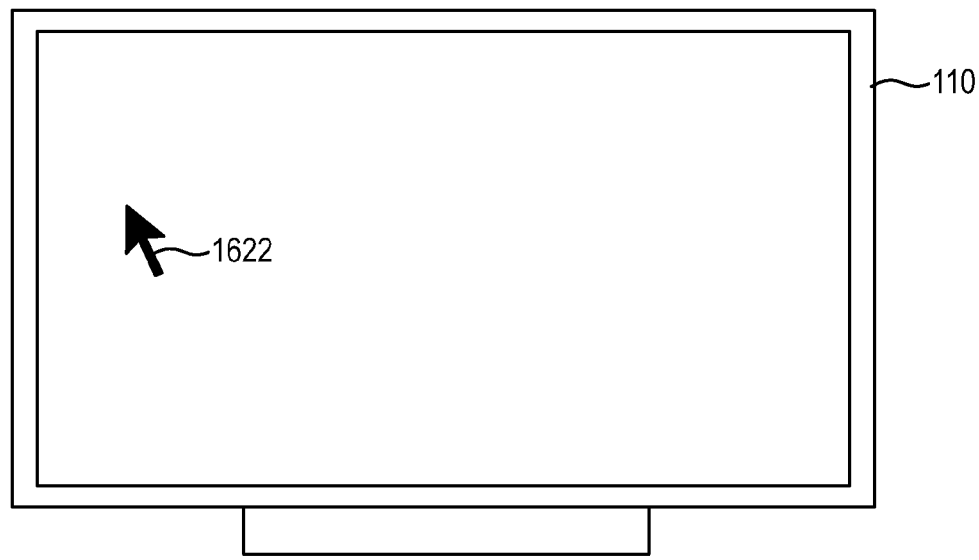

The mapping of camera center 1602 to the virtual TV coordinates can be computed as an intermediate process shown in FIGS. 16B through 16D before final computation of the cursor position in the real TV screen coordinates. FIG. 16B illustrates the computation of the cross ratio in the virtual TV coordinates 1302. FIG. 16C illustrates the map of the camera center to the virtual TV coordinates, with a virtual cursor 1610. FIG. 16D illustrates a map of the virtual cursor to real TV coordinates, with a real cursor 1622. Once the above intermediate mapping completes the computation of virtual cursor, $V_{Cur}(Vx, Vy)$, in the virtual TV screen coordinates, the remaining mapping process is to map the virtual cursor position in the virtual TV screen coordinates to the real cursor position, $Cur(x,y)$, in the real TV screen 110 coordinates shown in FIG. 16D. The calculation of these values is shown below in Equations 5 and 6.

$$x = Vx/\text{expansion rate for width}$$

$$y = Vy/\text{expansion rate for height} \quad \text{Equations 5 and 6}$$

3.6 Estimation of the Dimensions of a TV Frame Using Pre-Measured Database Look-Up Tables In some embodiments, a look-up table database can be developed to provide the remote controller with the dimension of the TV frame as a reference data image segmentation process described with reference to FIG. 4E. The look-up table can contain the captured data of TV frame dimension (e.g., the width and height in pixel coordinates) that is actually measured by the 2D/3D imaging sensor at various 3D location and orientation from the TV frame.

When the 3D camera obtains the distance (e.g., depth data) of the TV frame on the remoter controller at beginning of cursor navigation, the imaging sensor can also capture the one-shot image. Using this image, as described above, the remote controller can send the four corner positions of the one-shot image in the pixel coordinates to the TV remote controller support module.

Figure 17:
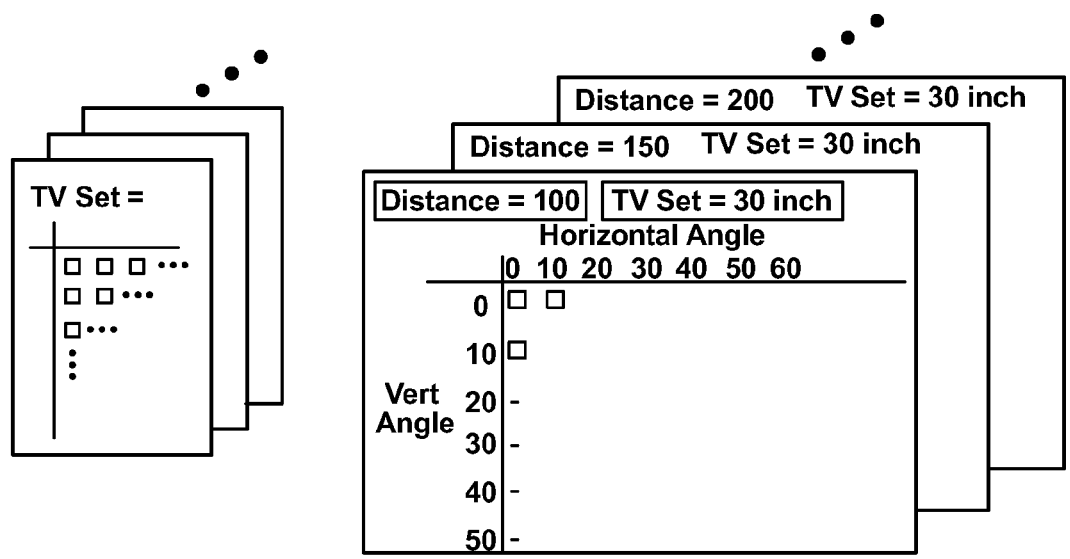
FIG. 17 is a graphical representation of a lookup table.
Figure 18:
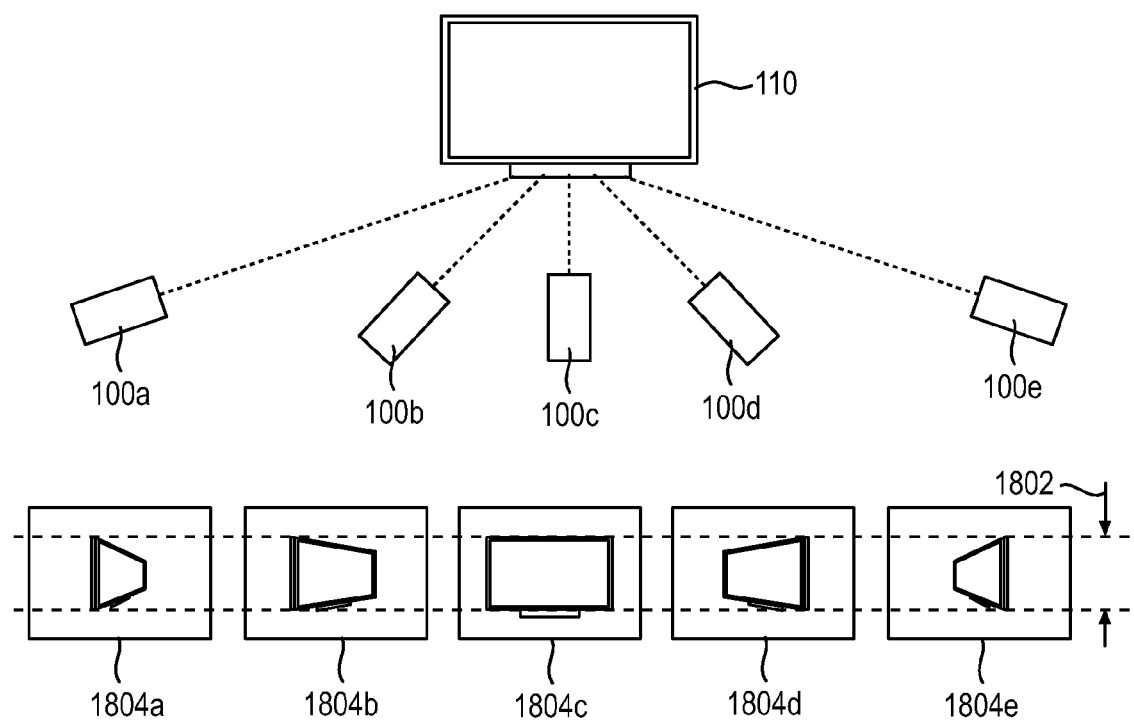
FIG. 18 is a front view of a remote controller capturing graphical images of the TV display at multiple horizontal angles and the resulting graphical images.
Figure 19:
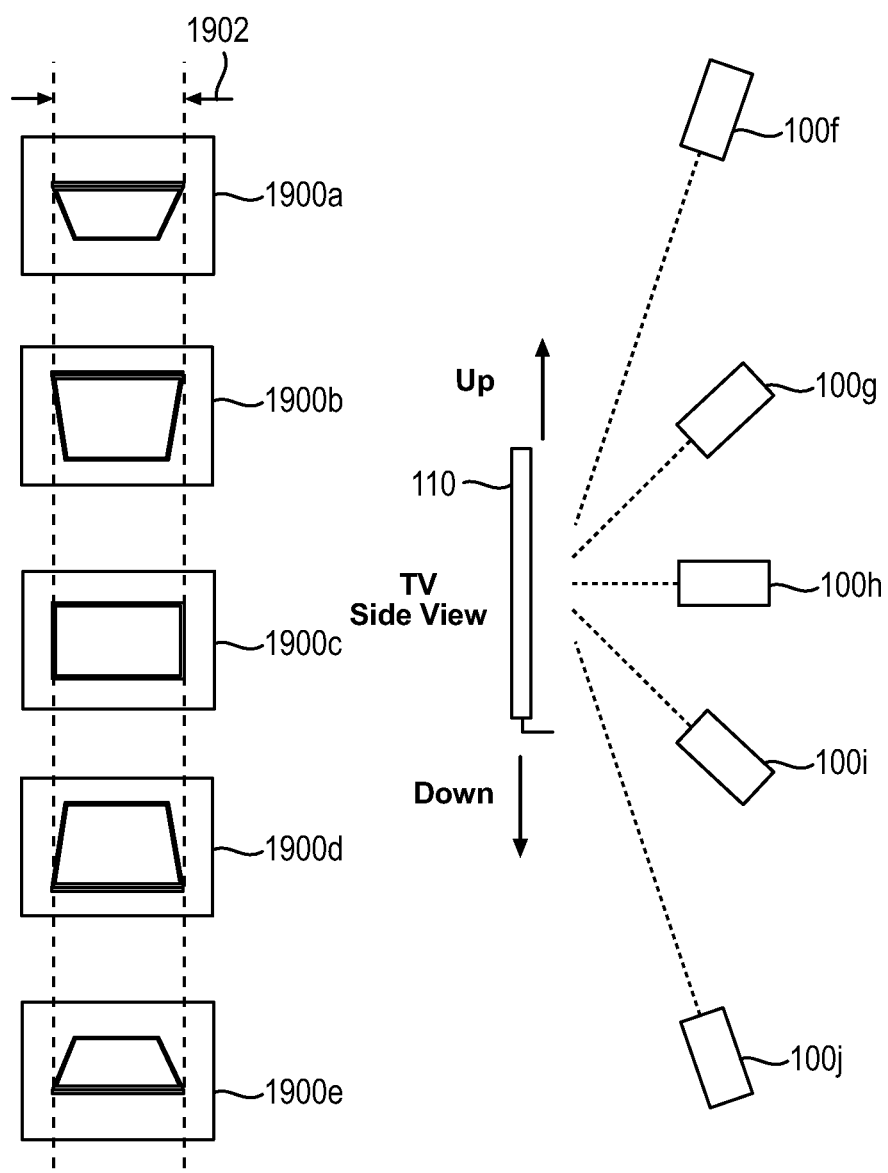
FIG. 19 is a side view of a remote controller capturing graphical images of the TV display at multiple vertical angles and the resulting graphical images.

In some configurations, a cursor navigation module in the TV remote controller support module can search the look-up table to obtain a reference dimension of the TV frame corresponding to the distance. The look-up table can have multiple tables corresponding to distance, as illustrated in FIG. 17. However, in some instances, the imaging sensor of remote controller might capture the TV frame image from non-zero horizontal-vertical angles shown in FIGS. 18 and 19. These Figures show the captured images 1804*a-e* and 1900*a-e* taken by remote controller 100*a-j* at multiple horizontal angles relative to the TV screen 110 (shown in FIG. 18) as well as multiple vertical angles (shown in FIG. 19). It will be noted, in FIG. 18, a TV length 1802 remains constant, and in FIG. 19, a TV width 1902 remains constant. The cursor navigation module can thus take the base case dimension (both horizontal/vertical view angles are zero), and then compare its width and height data with four boundary lines of captured images shown in FIGS. 20A through 20D. This comparison result indicates which angle/direction is deformed from base case dimension. The cursor navigation module can then search the closest dimension data in the look-up table to the captured one-shot image for its reference dimension. This reference dimension can be sent to the remote controller to be used for object segmentation process in every time tick to detect the TV frame object among other objects located at the same distance in the FIG. 4E.

However, in some instances, the reference dimension may not be correct if the location and orientation of remote controller is significantly changed. If the remote controller cannot successfully segment the TV frame image using this reference dimension due to an incorrect reference dimension, then the remote controller may send the TV remote controller support module a request to display the one shot graphic display again (i.e. distinctive graphic object image such as blue screen) to revise the reference dimension.

Handling of the Z-Angle

The Z-angle change is a rotation of the imaging sensor about an axis perpendicular to the TV screen. Z-angle changes may be used by the remote controller for the TV command or for voice control of TV. Generally, a Z-angle change is not used for cursor navigation since it does not necessarily change the cursor location. Therefore, the cursor navigation module can change the cursor icon to the user programmable non-cursor icon if the Z-angle is larger than threshold value, such as, for example, about 10, 15, 20, 25, 30, 35, 40, 45, 50, 55, 60, or greater than 60 degrees. In this case, the cursor navigation function can temporarily stop its position update processes.

However, if the Z-angle is smaller than threshold value, then the cursor navigation can compute the centroid of a captured TV frame image and then utilize the virtual TV frame for cross ratio calculation as same as that for Z-angle is zero case. The Z-angle can be estimated to execute an approximated calculation of the tangent angle of the X-axis and the longer side line of the captured image of the TV frame, as shown in FIG. 21. FIG. 21 illustrates a captured image 2100 having a camera center 2104 and a TV frame 2102 disposed at a Z-angle 2106.

Simultaneous Coarse-Fine Mode Operation of Cursor Command Generation

Figure 22:
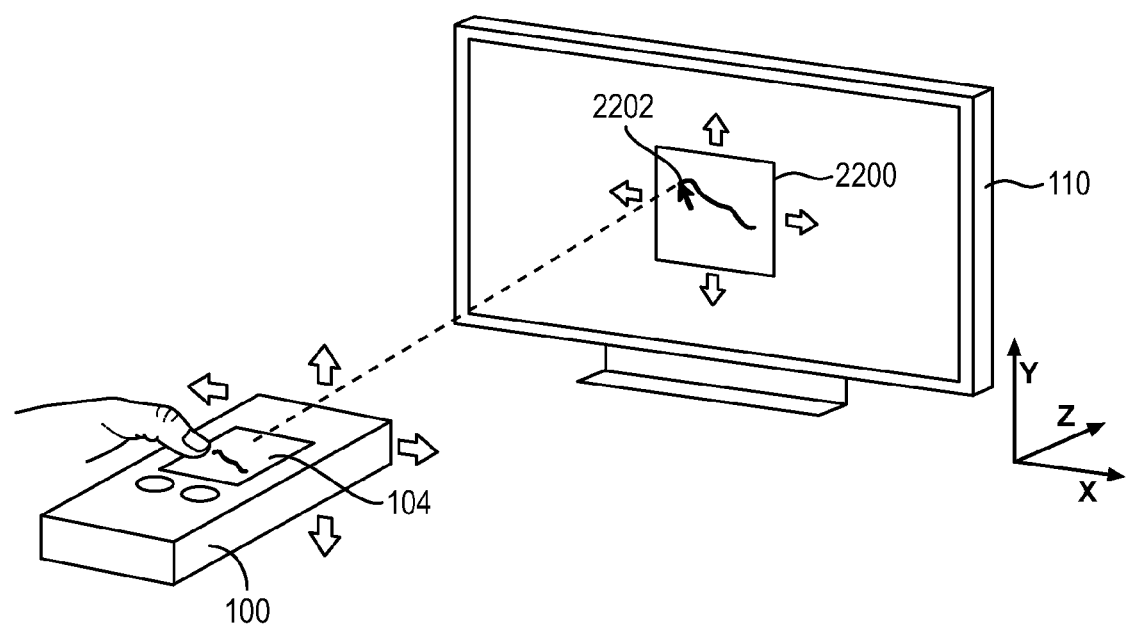
FIG. 22 is a perspective view of a remote controller and TV display utilizing coarse-fine control features of the remote controller.

Reference will now be made to FIG. 22, which depicts the input generation of simultaneous coarse-fine control in an X-Y plane. As described in the sections above, the absolute position of cursor in the TV screen coordinates can be obtained from the cross ratio based projective mapping from the pixel plane to the TV frame plane. The user programmable portion mapping area 2200 could be defined around the current cursor position 2202 for fine control by touchpad 104. The cursor can continually be within the portion mapping area 2200 and the portion mapping area can simultaneously move the same trajectory of cursor when the cursor 2202 moves.

Figure 23A:
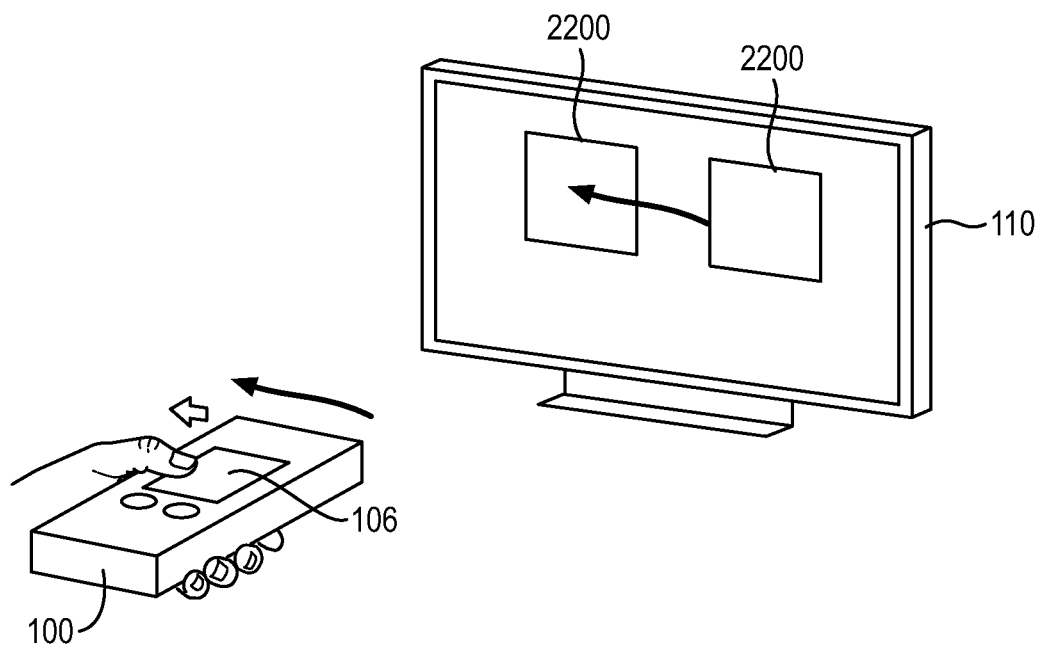
FIG. 23A is graphical representations of the translation of a portion mapping area on a display screen.
Figure 23B:
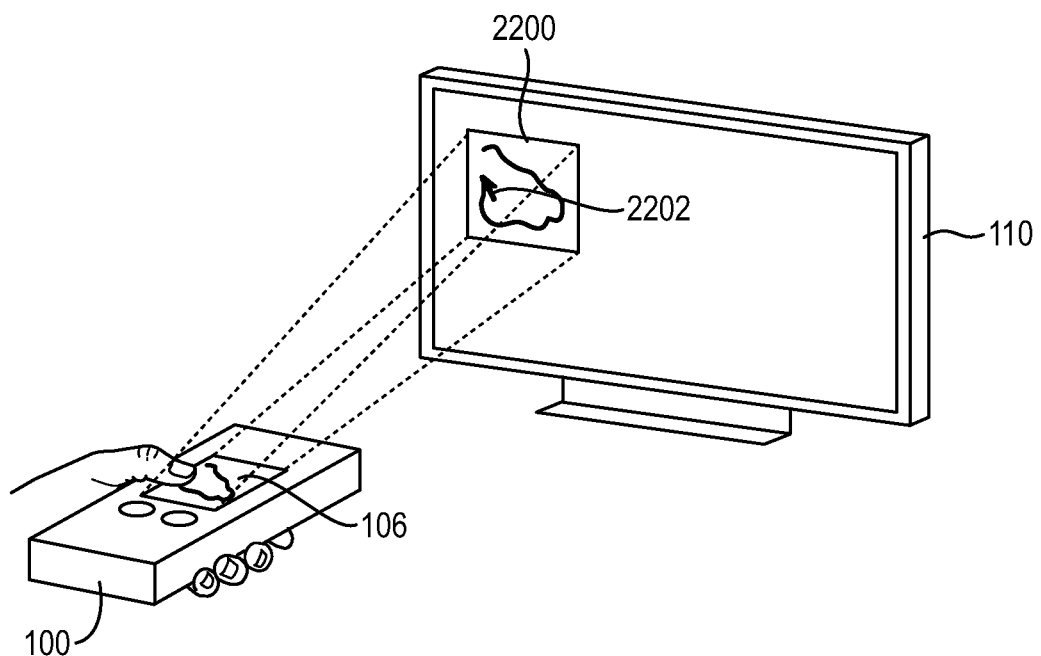
FIG. 23B is graphical representation of the cursor movement within a portion mapping area on a display.

The user can move the remote controller 100 to navigate the cursor 2202 and the portion mapping area 2200 as coarse control of desired area for cursor positioning, then use finger touch or drag the cursor 2202 for fine positioning using the touchpad 106. Using fine control, the user can move the cursor 2202 to any location within the portion mapping area 2200. FIGS. 23A and 23B depict the remote controller 100 providing coarse control of cursor by movement of remote controller 100 (in FIG. 23A) and then providing fine control of cursor by touchpad 106 (in FIG. 23B).

This concept can be also applied to any coarse input control devices such as inertial sensor based remote controller. With a touchpad sensor, gyro sensor or accelerometer sensor data can be used for coarse control of cursor positioning and the touchpad 106 can provide fine control of cursor positioning. A small trackball, mini-joystick, or other functionally equivalent device can also be used instead of touchpad 106 to achieve simultaneous coarse-fine control scheme.

Figures 24A, 24B, 24C:
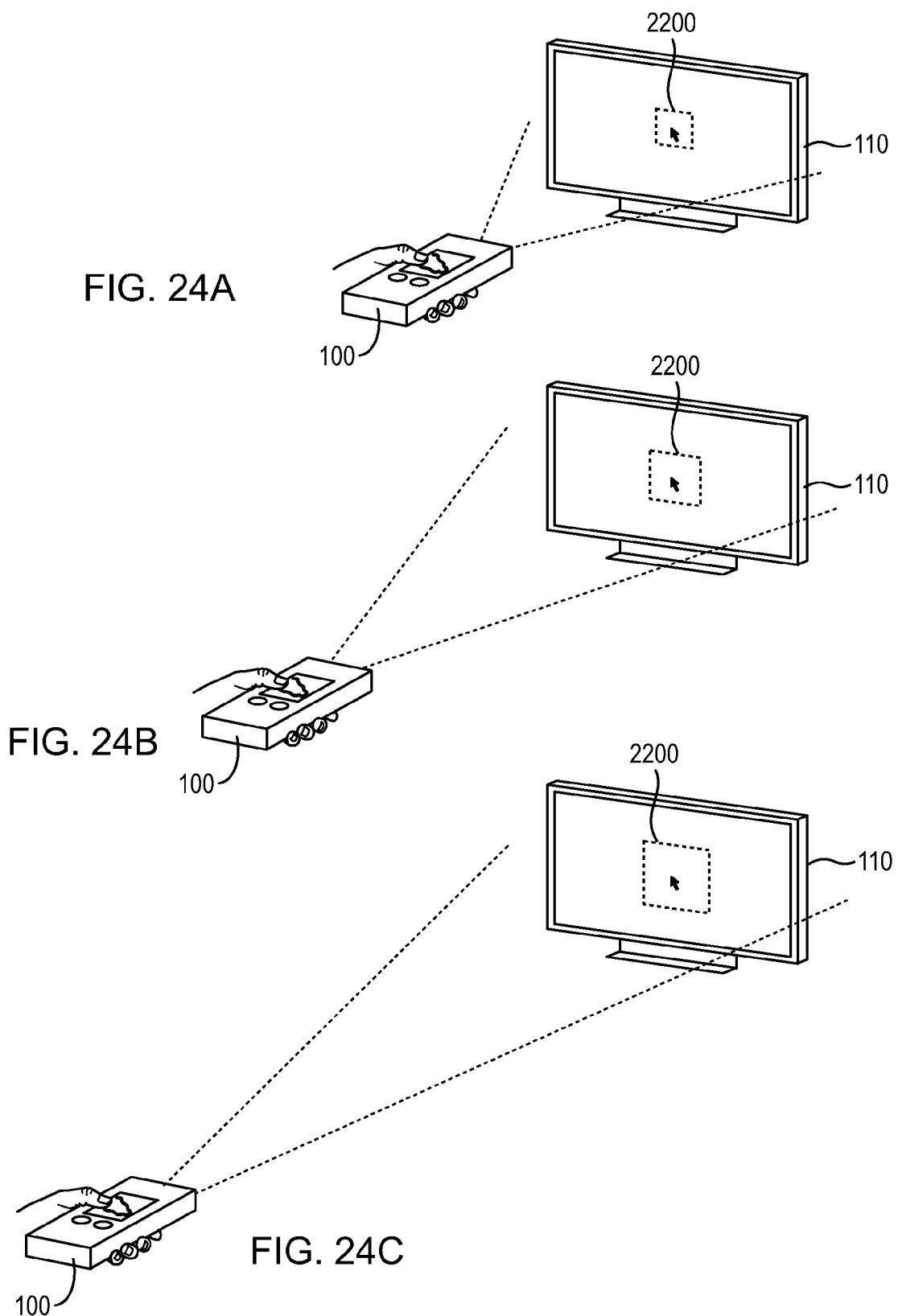
FIGS. 24A through 24C are perspective views of a remote controller at different distances from a TV and the resulting sizes of a portion mapping area.

Turning to FIGS. 24A through 24C, the size of the portion mapping area 2200 can vary depending on the distance between the TV 110 and the remote controller 100. The longer the distance from TV screen, the lower precision of cursor control by imaging sensor would be provided.

Figure 25A:
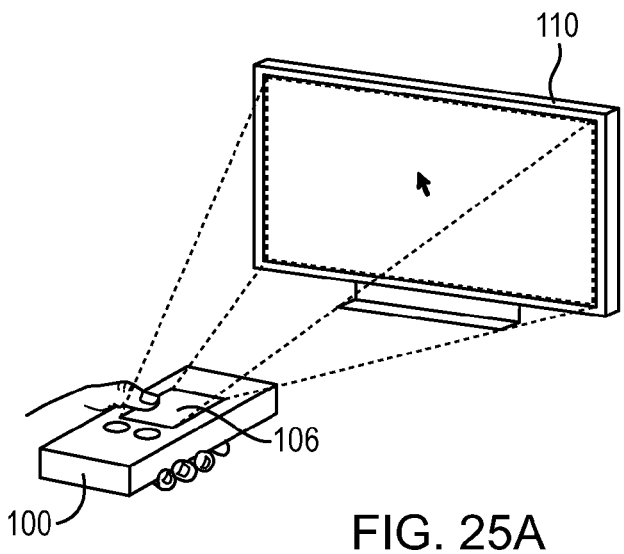
FIGS. 25A through 25C are graphical representations of three separate cursor control modes.
Figure 25B:
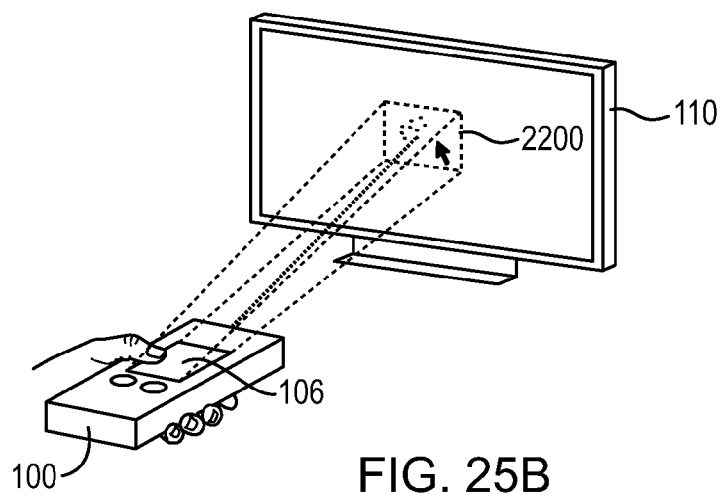
Figure 25C:
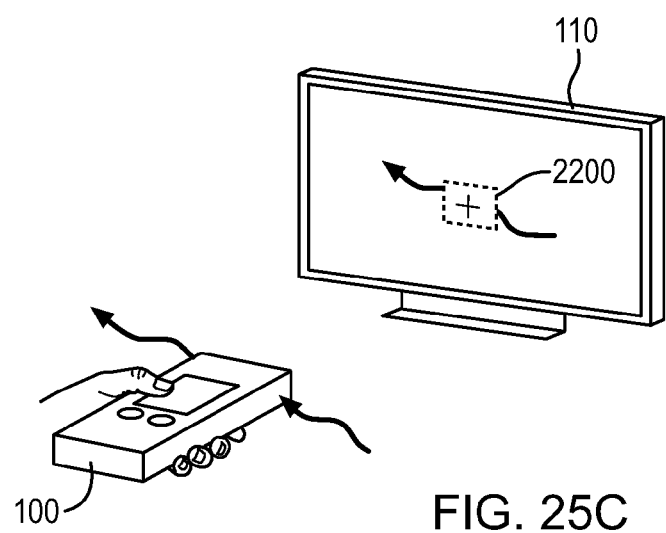

FIGS. 25A through 25C depicts three optional cursor control modes for the end user that provides (i) relative cursor positioning by digitizer only, (ii) simultaneous coarse/fine control of cursor, (iii) coarse control by remote controller body with imaging sensor data only.

Figure 26A:
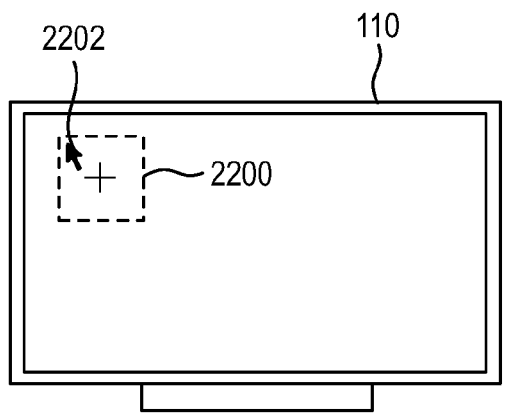
FIGS. 26A through 26D illustrate a process for avoiding "bumpy" cursor navigation.
Figure 26B:
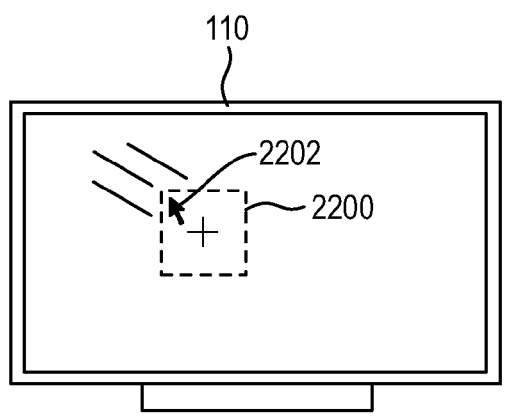
Figure 26C:
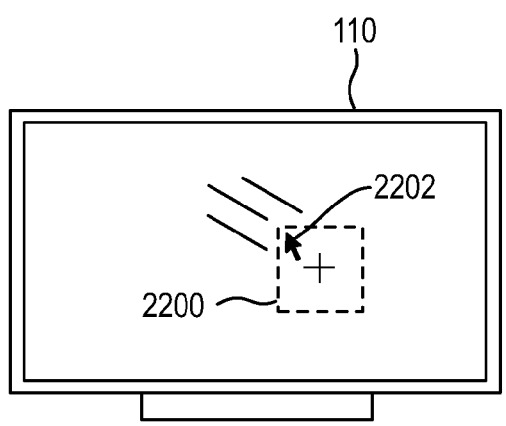
Figure 26D:
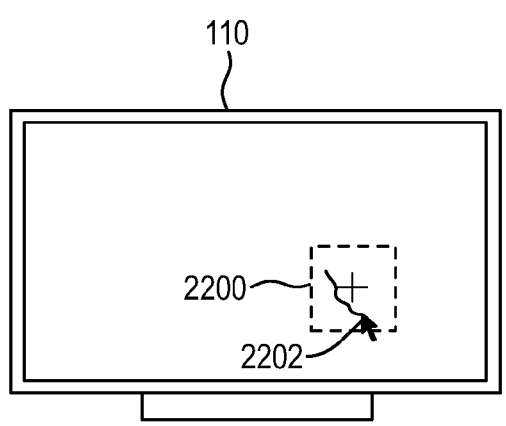

FIGS. 26A through 26D depict how to avoid "bumpy" cursor navigation at transition between coarse and fine control. In FIG. 26A, finger dragging is just finished and the position of cursor 2202 is located upper left corner of the portion mapping area 2200. When the user tries to navigate cursor by movement of remote controller 100, as shown in FIGS. 26B and 26C, the cursor 2202 can also keep the same local position within the portion mapping area 2200. Once the movement of remote controller 100 is terminated or less than threshold of movement value, then the user can re-start finger dragging with the touchpad to initiate fine cursor control.

Cursor Navigation Under Very Short Distance Between the TV and the Remote Controller If the distance between TV screen surface and the remote controller is very short, then the imaging sensor may not be able to capture entire TV frame to detect four corners of TV screen frame. In this case, the firmware of the remote controller can automatically switch the priority of cursor navigation from the imaging sensor to the touchpad and send a notice of "too close to the TV" to the host TV remote controller support module. The host TV program can display a caution message to tell user the problem of distance and availability of digitizer for cursor navigation under this situation.

Three-Dimensional Input Mode

Figure 27A:
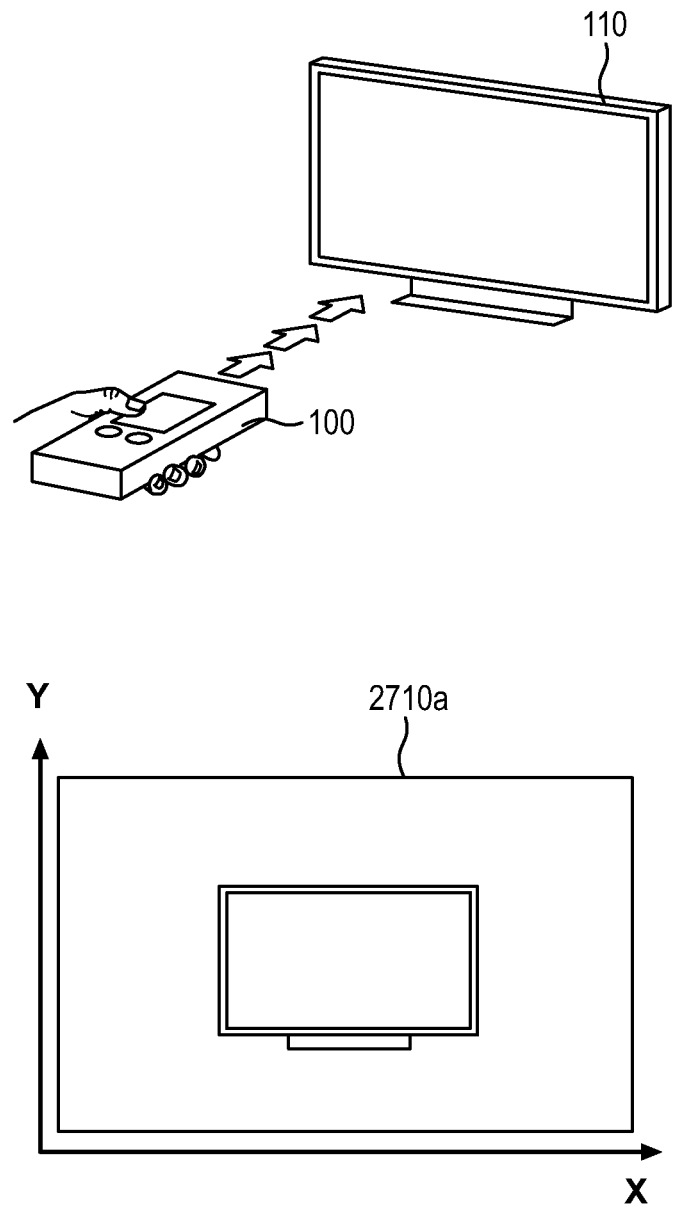
FIGS. 27A and 27B illustrate a representative additional one-degrees-of-freedom input gesture by Z-axis movement and the resulting displayed image.
Figure 27B:
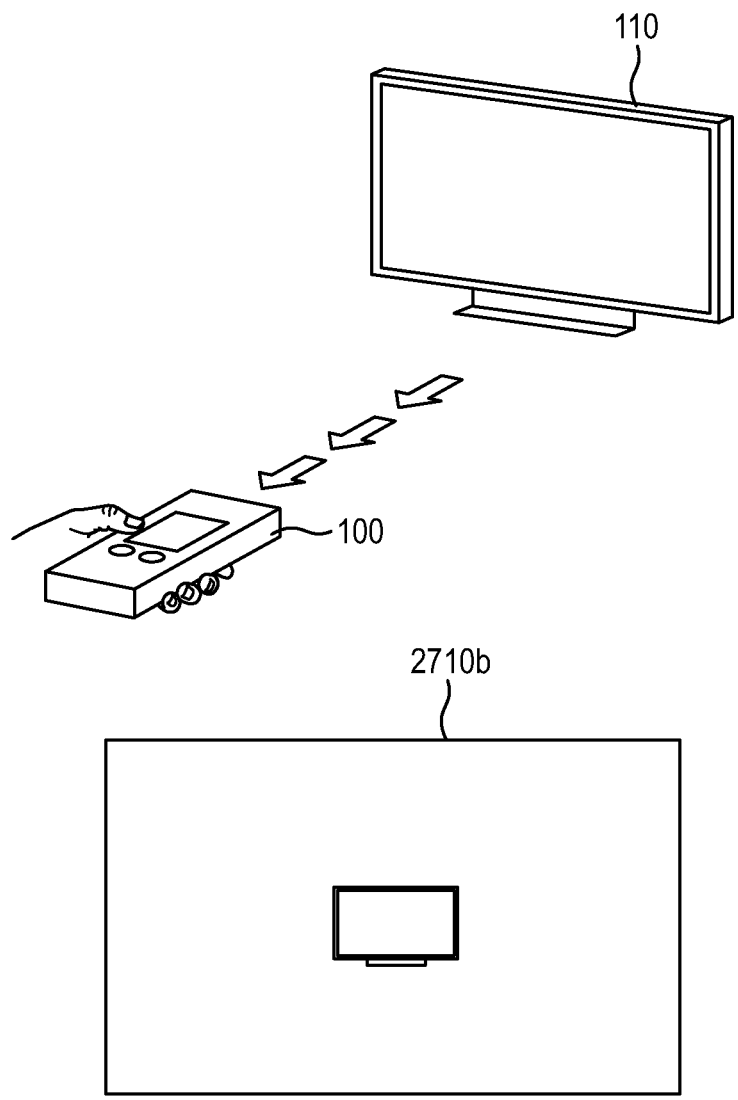
Figure 27C:
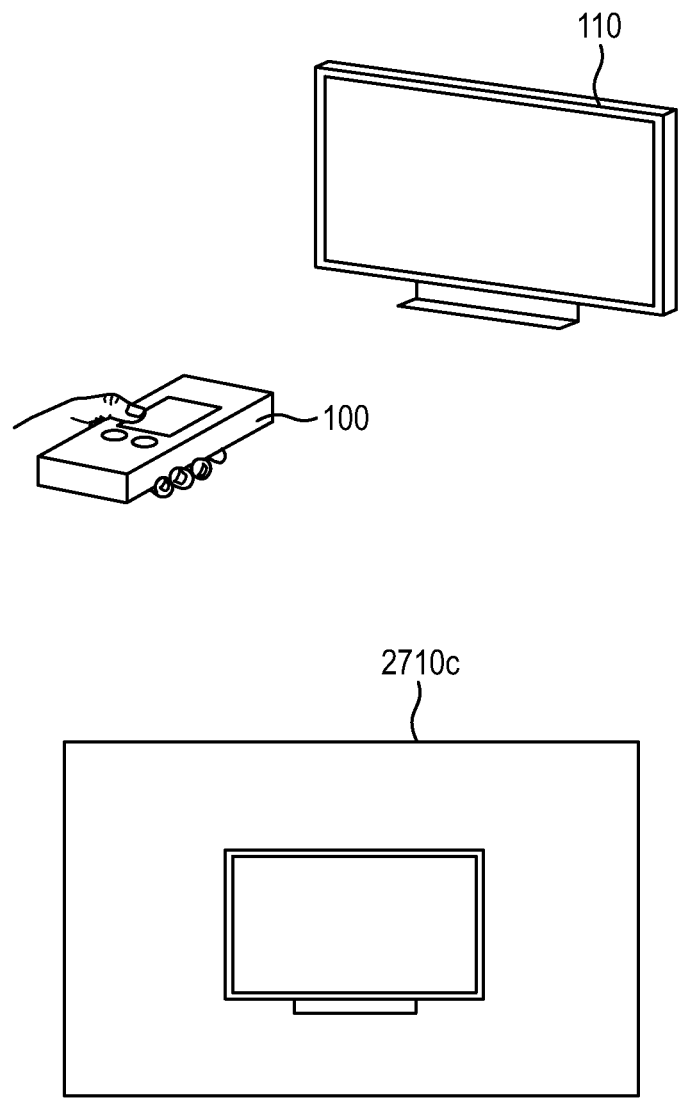
FIGS. 27C and 27D illustrate a representative additional one-degrees-of-freedom input gesture by rotation around Z-axis and the resulting displayed image.
Figure 27D:
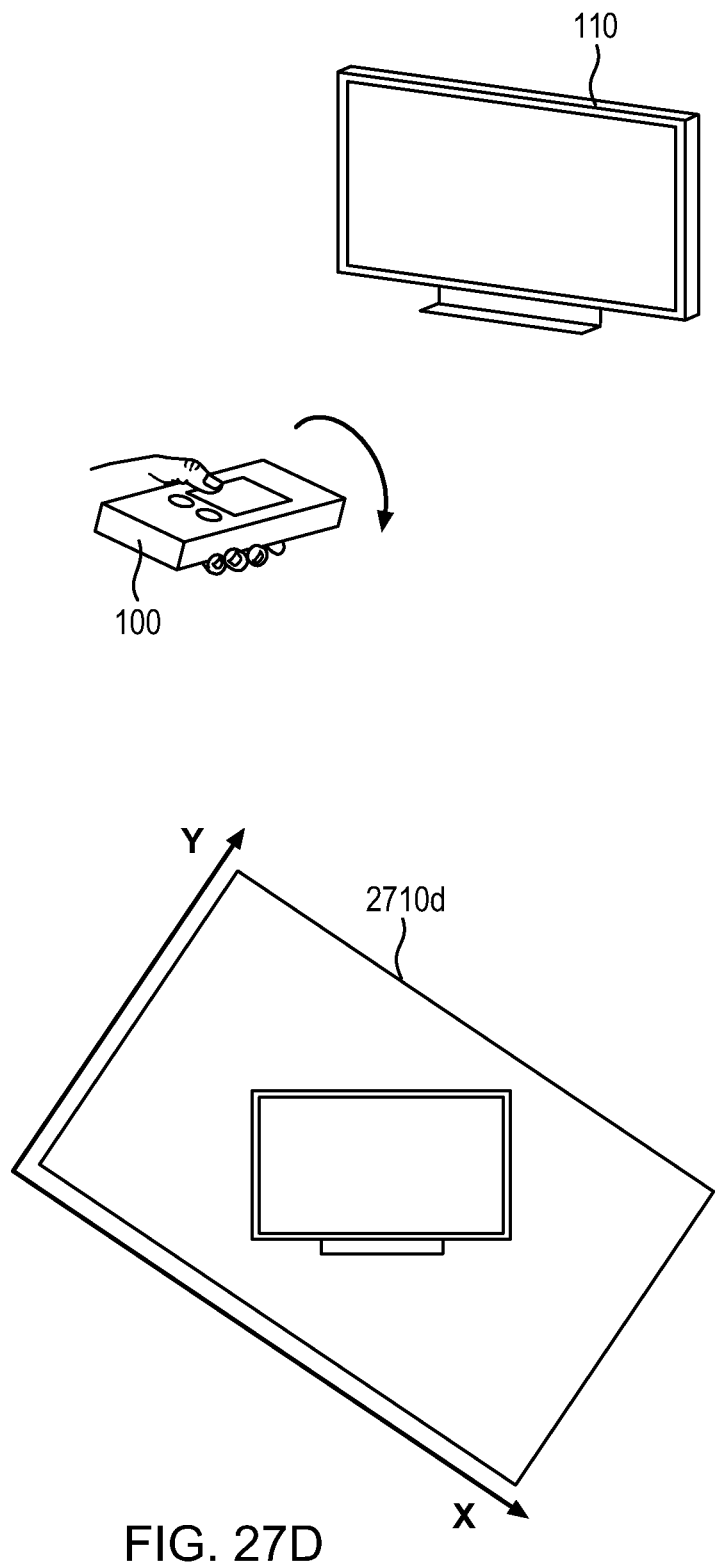

FIGS. 27A through 27D depict additional two degrees of freedom (DOF) input commands generated by the remote controller 100 including an Z axis translation command (shown in FIGS. 27A and 27B) and a rotation command about the Z axis (shown in FIGS. 27C and 27D). The TV remote controller support module can be developed to utilize the scale change of the captured TV frame object 2710a through 2710b for generating a zoom-in/zoom-out command. The calculation of Z-angle change described in the above section could be used for user specific command such as sound volume control.

Figure 28A:
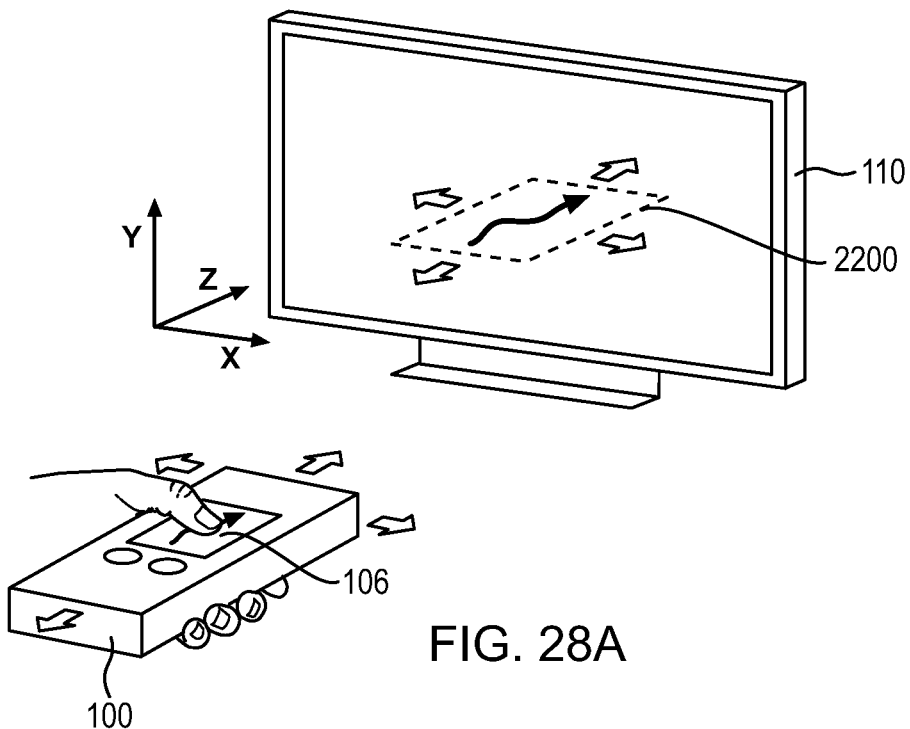
FIGS. 28A and 28B illustrate representative cursor movement generation in three dimensions.

When used with a 3D graphics application, a user may move a 3D cursor in a 3D environment to select 3D objects. For example, as shown in FIG. 28A, a user can move the remote controller 100 in a forward and backward direction to generate coarse control commands and/or move the remote controller 100 in a right and left direction to generate X translation command of the 3D cursor. The finger touch signal can also be used to generate fine control of 3D cursor within the user programmable mapping area 2200 on an X-Z plane.

Figure 28B:
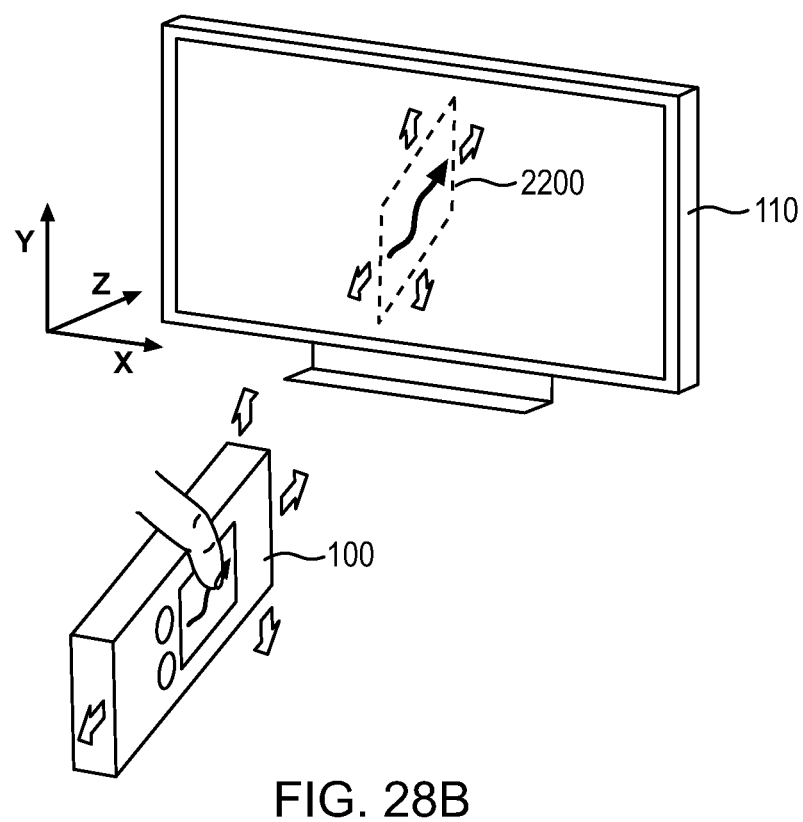

As shown in FIG. 28B, the user can also move the remote controller 100 to generate coarse control command of Y translation or Z translation of the 3D cursor. Moreover, the finger touch signal can generate fine control of the 3D cursor within the user programmable mapping area 2200 in the Y-Z plane.

Gesture Input Mode in Free Space

In some embodiments, the user can generate 2D or 3D gestures input in free space by moving the remote controller 100 while touching the touchpad 106. As previously mentioned, a button (shown in FIG. 1) can be installed on the remote controller body and be used to toggle between three control states: a 2D cursor mode, a gesture mode by remote control body movement, and the multi-touch gesture mode.

Figure 29A:
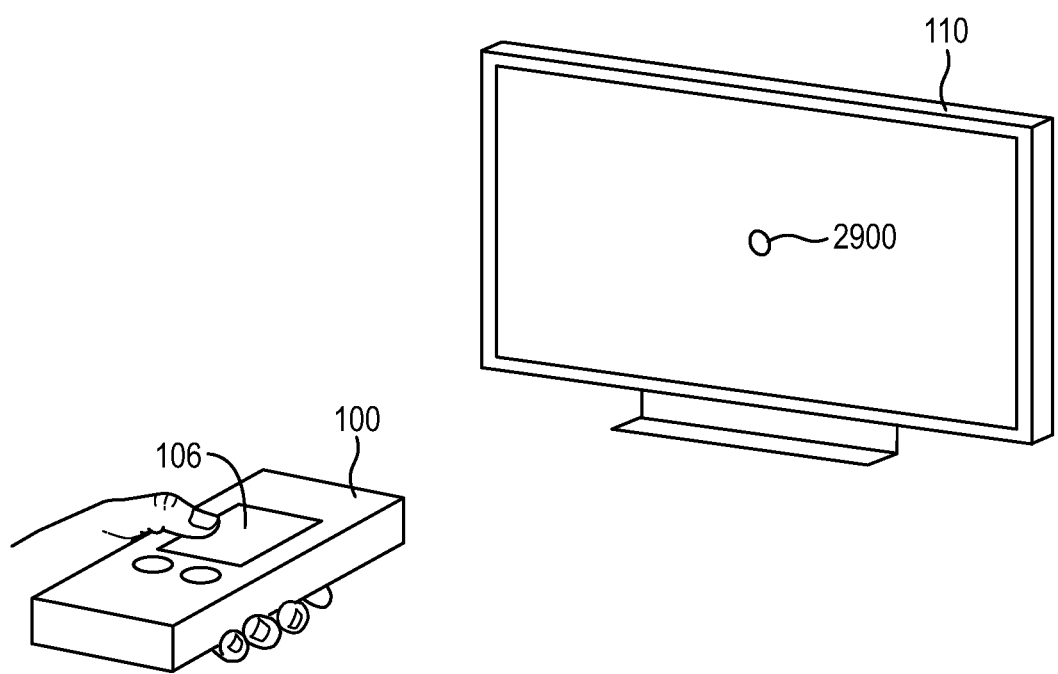
FIGS. 29A through 29C illustrate a representative two-dimensional gesture in free space.
Figure 29B:
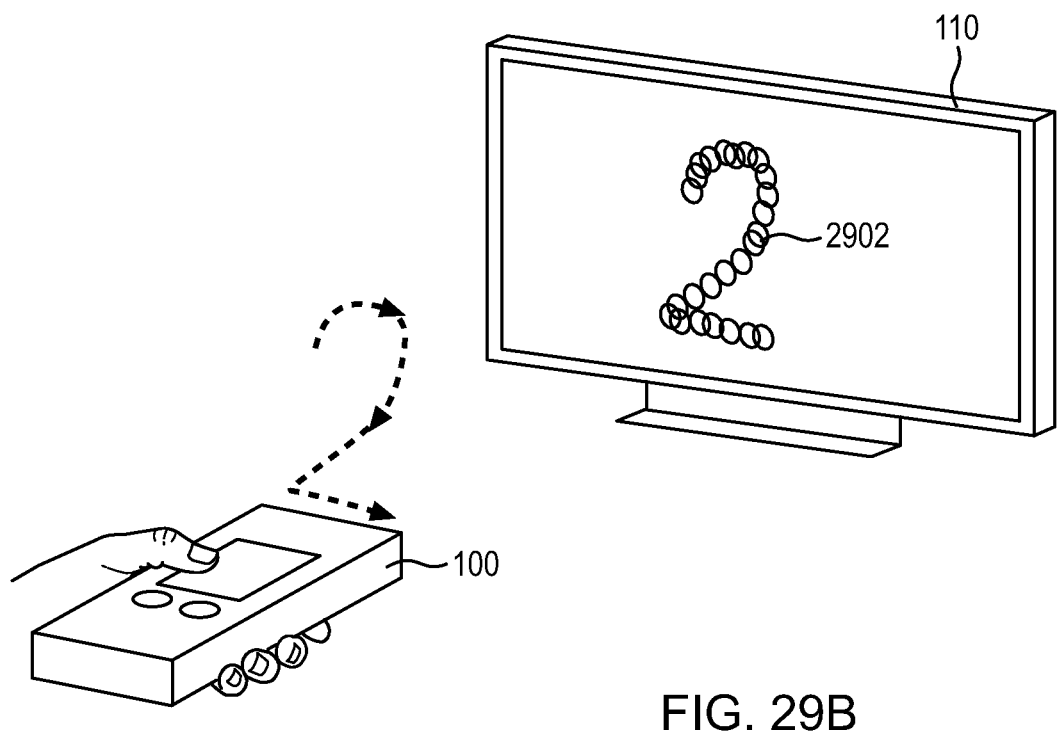
Figure 29C:
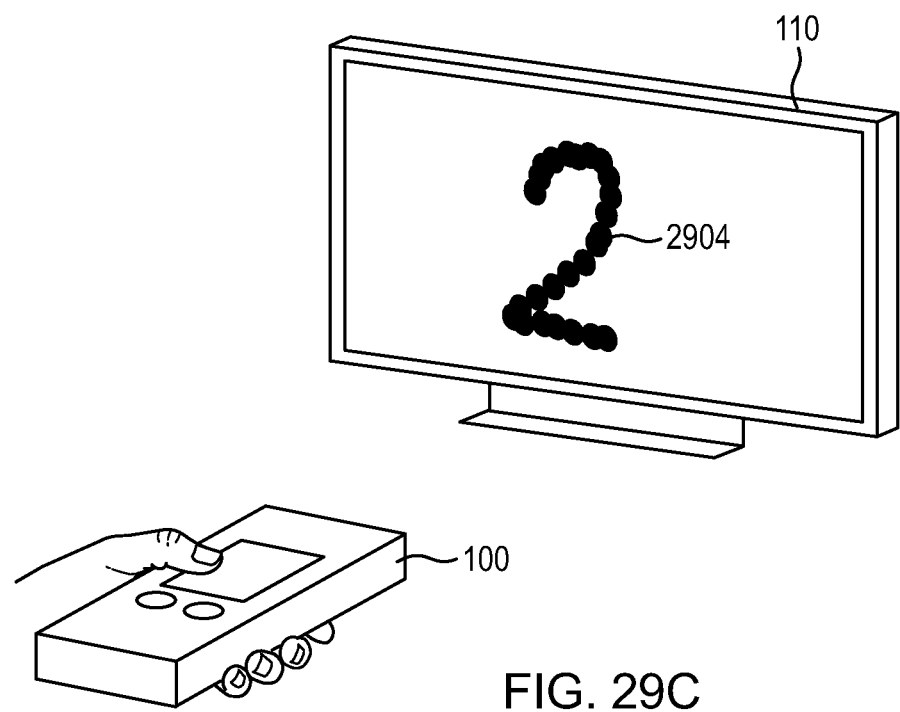
Figure 30A:
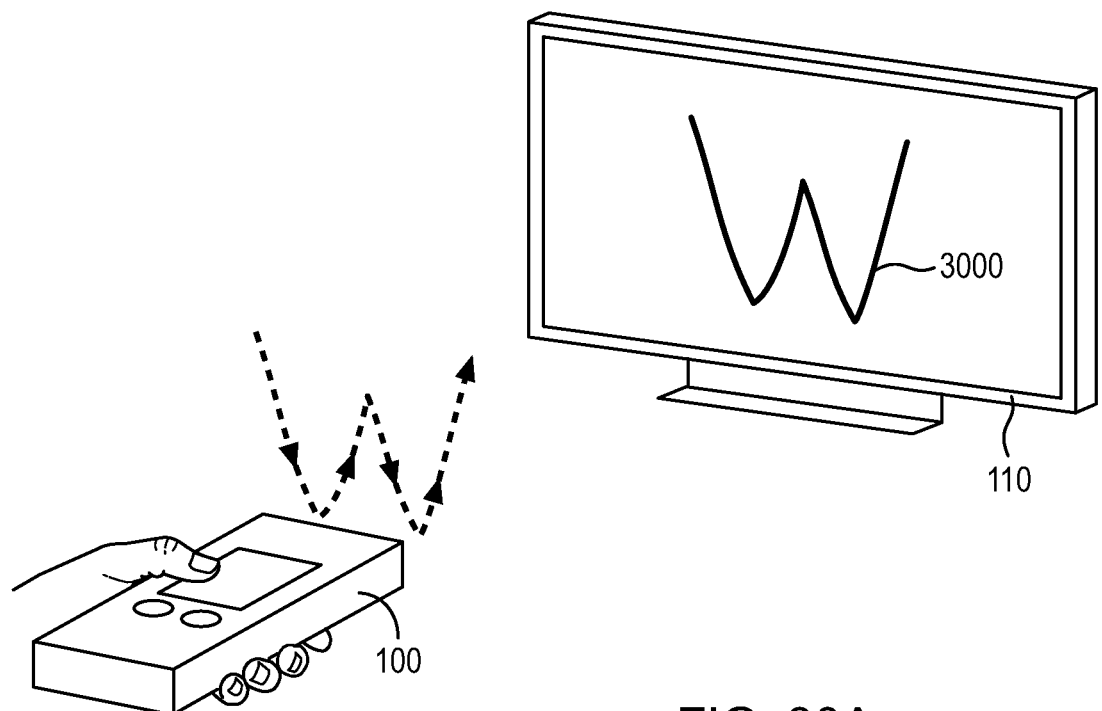
FIGS. 30A through 30B illustrate representative three-dimensional gestures in free space.
Figure 30B:
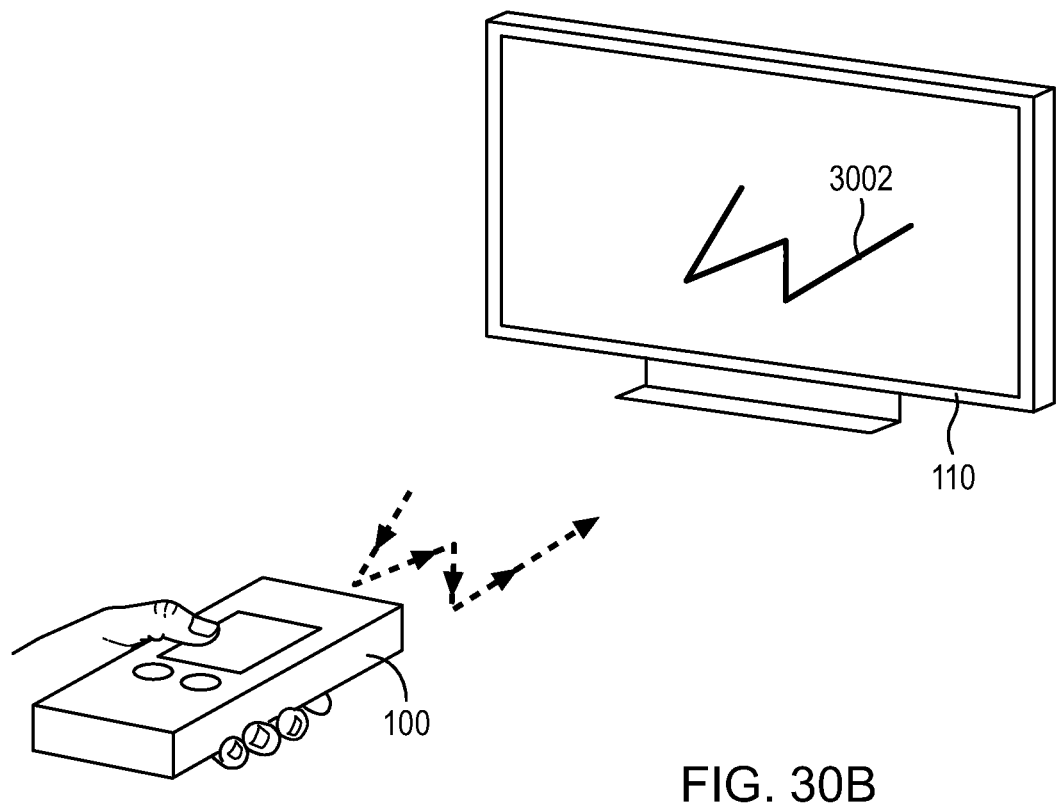

FIGS. 29A and 29B depict an example of 2D gesture input in free space. If user touches the surface of touchpad 106, then a "bubble" icon 2900 can be displayed when in gesture mode. When user subsequently moves the remote controller in free space, the bubble trajectory can be traced on TV display. The gesture recognition application program at the host TV side can be developed to correctly identify a uni-stroke character 2902 (e.g., a single alphanumeric character). If the gesture recognition program can successfully identify the character, then the program can display a solid colored trajectory 2904 to indicate the successful result to the user. This gesture input feature can also be expanded to 3D gestures. FIGS. 30A and 30B depict how to generate 3D like bubble trajectory 3000, 3002 in 3D space by movement of remote controller 100 in X-Z plane.

Multi-Touch Input Mode

Figure 31A:
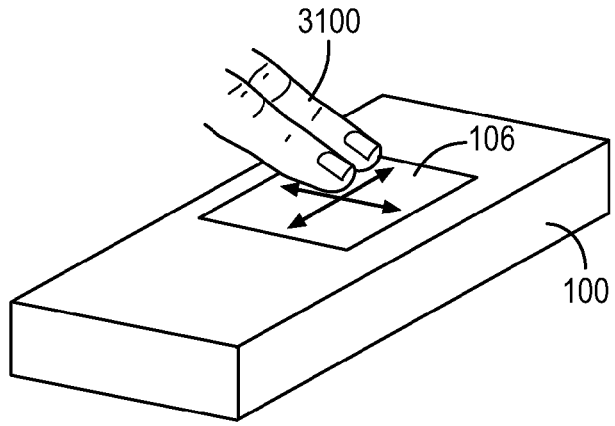
FIGS. 31A through 31C illustrate representative multi-touch finger gestures on a multi-touch touchpad.
Figure 31B:
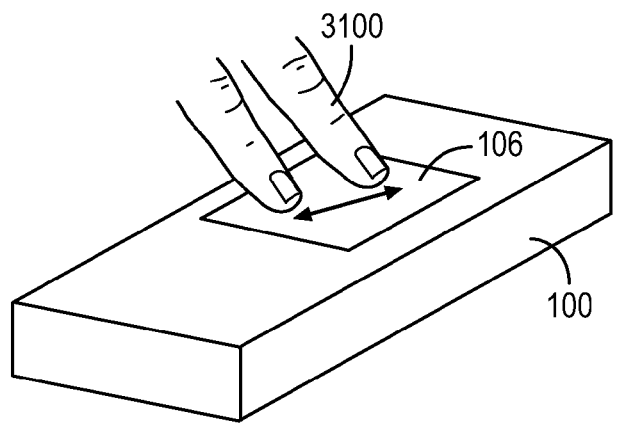
Figure 31C:
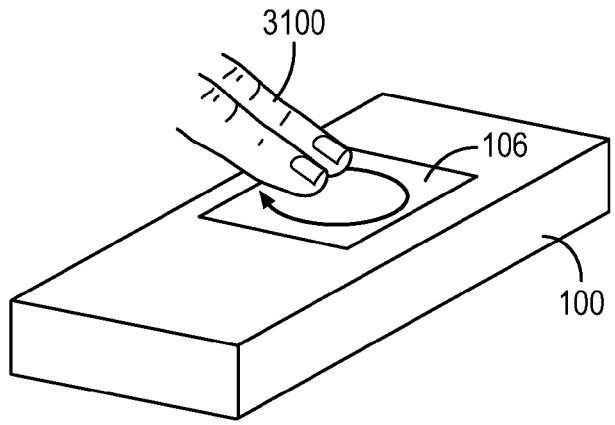
Figure 32:
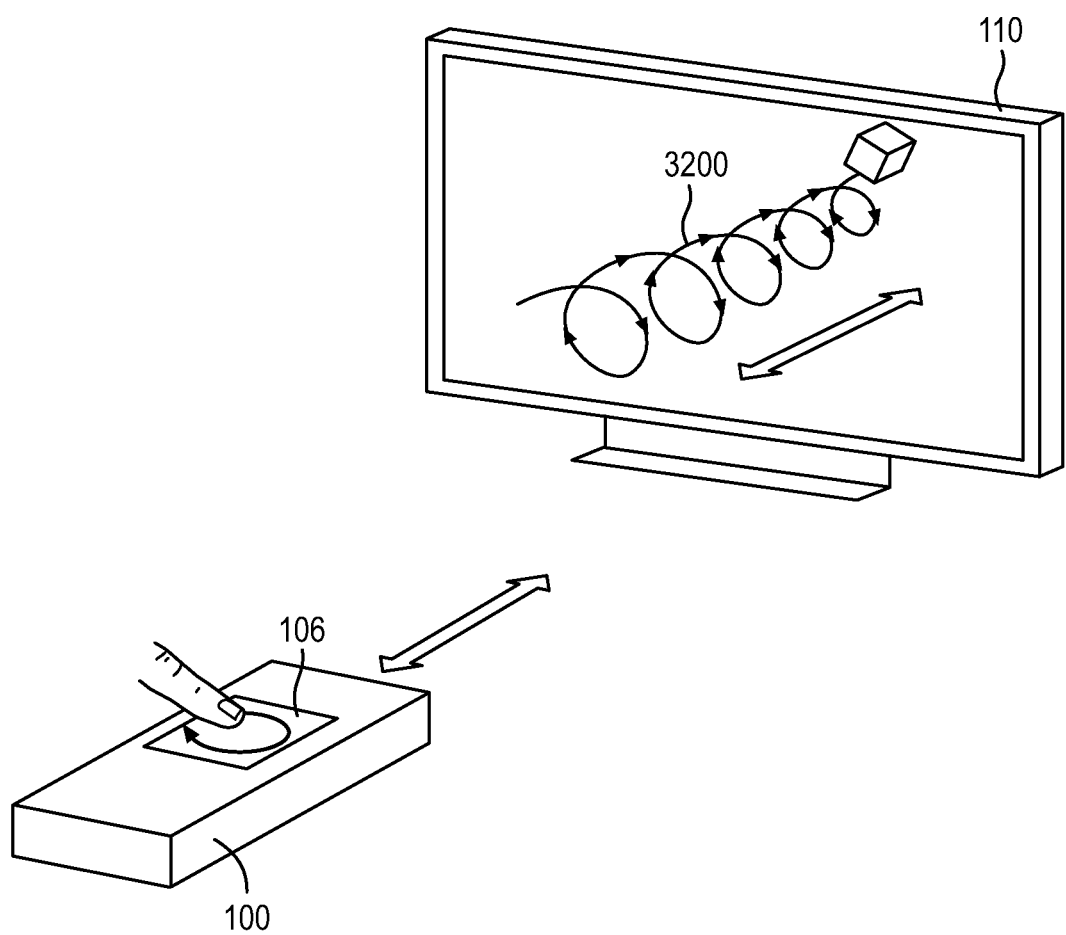
FIG. 32 is a graphical representation of a three-dimensional gesture utilizing inputs from both the imaging sensor and the touchpad.

In some embodiments of the multi-touch input mode, the touchpad data can be used as the sole input command. In order to avoid unexpected and/or undesirable input by shaking of remote controller body, the imaging sensor data may be suppressed as a default condition. FIGS. 31A through 31C depict an additional four DOF input command generation using several two-finger gestures on the surface of touchpad 106 using the fingers 3100. However, some users might want to use simultaneous input data of both multi-touch finger gesture on the digitizer and movement data of remote controller body. The firmware and host TV program can thus allow users to utilize those two input data at once as an optional usage. FIG. 32 depicts an example of a spiral input command 3200 generated by the combination of the imaging sensor and touchpad simultaneously.

FIG. 32 illustrates a user generating a coarse Z translation command by moving remote controller in a forward/backward direction. At the same time, the user can be generating a rotation command about Z-axis with a finger gesture on the touchpad 106. During this combined gesture, firmware on the remote controller 100 and on the host TV interface software can generate the Z axis rotation command by conversion from circular trajectory of finger gesture to 3D rotation command in 3D graphics environment.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A method for generating a TV input command using a remote controller having an imaging sensor and a TV display screen having four corners with corresponding pixel coordinates, the method comprising:

identifying, using a remote controller, the corners of the TV display screen from a graphical image captured by an imaging sensor of the remote controller;

performing edge detection and segmentation of the graphical image using reference TV dimensions of the TV display screen to identify the pixel coordinates of the four corners of the TV display screen in the graphical image;

mapping, using a remote controller support module of the TV, a camera center position in the pixel coordinates to virtual TV coordinates using a cross ratio algorithm;

mapping, using the remote controller support module, a location of a cursor in virtual TV coordinates to the coordinates of the TV display screen identifying a quadrant of the camera center in the TV display screen in the graphical image;

calculating a position of virtual markers that avoid collinear positioning in the cross ratio algorithm; and using the position of virtual markers in the cross ratio algorithm.

2. The method of claim 1, further comprising identifying the reference TV dimension corresponding data using a look-up table.

3. The method of claim 2, wherein the look-up table includes reference TV dimensions relating to the distance of the remote controller from the TV display screen at various three-dimensional locations and orientations.

4. The method of claim 1, further comprising sending depth data and pixel coordinates of the four corners of the TV display screen in the graphical image to the remote controller support module of the TV.

5. The method of claim 1, further comprising:

identifying when the remote controller is more than a predefined distance from the TV display screen;

defining a virtual TV frame within the graphical image around a centroid of the TV display screen in the graphical image;

calculating the position of virtual markers using the virtual TV frame; and using the position of virtual markers in the cross ratio algorithm.

6. The method of claim 1, further comprising generating a cursor navigation command and displaying a cursor on the TV display screen.

7. The method of claim 1, further comprising repeating the step of performing edge detection and segmentation and the step of mapping the location of the cursor in the virtual TV coordinates to the coordinates of the TV display screen.

8. The method of claim 7, further comprising stopping the repetition of the step of performing edge detection and segmentation and the step of mapping the location of the cursor in the virtual TV coordinates to the coordinates of the TV display screen when a Z-angle change is being greater than a predetermined value.

9. The method of claim 1 further comprising:

defining a portion mapping area around the location of the cursor position in the coordinates of the TV display; and moving the location of the cursor position within the portion mapping area based on input data from a touchpad of the remote controller.

10. The method of claim 9, further comprising maintaining the cursor position constant in relation to the portion mapping area when the location of the portion mapping area is changed in response to image sensor data.

11. The method of claim 9, further comprising varying the size of the portion mapping area when the distance between the remote controller and the TV display screen changes.

12. The method of claim 1, further comprising modifying the location of the cursor in the TV coordinates based on input data from a touchpad of the remote controller.

13. The method of claim 1, further comprising recognizing free space gestures made using the remote controller based on movement of the remote controller.

14. The method of claim 1, further comprising switching between input modes of the remote controller to a mode that solely utilizes data from touchpad of the remote controller and does not use data from the imaging sensor.

15. A remote controller for use with a TV display screen having four corners with corresponding pixel coordinates, the remote controller comprising:

an imaging sensor configured to perform image capturing and depth sensing;

a multi-touch touchpad;

a microprocessor configured to process imaging sensor data and multi-touch touchpad data received from the imaging sensor and the multi-touch touchpad based one of a plurality of input modes, in at least one input mode the microprocessor is configured to (i) identify the corners of the TV display screen from a graphical image captured by the imaging sensor of the remote controller, (ii) perform edge detection and segmentation of the graphical image using reference TV dimensions of the TV display screen to identify the pixel coordinates of the four corners of the TV display screen in the graphical image, (iii) identify the quadrant of the camera center in a TV display screen of the graphical image, and (iv) calculate the position of virtual markers that avoid collinear positioning in a cross ratio algorithm.

16. The remote controller of claim 15, wherein in a multi-touch input mode the microprocessor is configured to only process data from the multi-touch touchpad.

17. A remote controller input system for a TV display screen having four corners with corresponding pixel coordinates, the system comprising:

a remote controller comprising:

an imaging sensor configured to perform image capturing and depth sensing;

a multi-touch touchpad;

a microprocessor configured to (i) identify the corners of the TV display screen from a graphical image captured by the imaging sensor of the remote controller, (ii) perform edge detection and segmentation of the graphical image using reference TV dimensions of the TV display screen to identify the pixel coordinates of the four corners of the TV display screen in the graphical image, (iii) identify a quadrant of the camera center in the TV display screen of the graphical image, and (iv) calculate the position of virtual markers that avoid collinear positioning in a cross ratio algorithm; and a remote controller support module of the TV, the remote controller support module being configured to (i) map a camera center position in the pixel coordinates to virtual TV coordinates using a cross ratio algorithm and (ii) map a location of a cursor in the virtual TV coordinates to the coordinates of the TV display screen.

* * * * *